US007591487B2

(12) United States Patent
Smith, III et al.

(10) Patent No.: US 7,591,487 B2
(45) Date of Patent: Sep. 22, 2009

(54) APPARATUS AND METHOD FOR DRAINING RESERVOIRS

(75) Inventors: Henry A. Smith, III, Tustin, CA (US); Patrick Neal Davis, S. Peterton Somerset (GB)

(73) Assignee: Complete Cryogenic Services, Inc., Tustin, CA (US)

( * ) Notice: Subject to any disclaimer, the term of this patent is extended or adjusted under 35 U.S.C. 154(b) by 529 days.

(21) Appl. No.: 10/983,357

(22) Filed: Nov. 8, 2004

(65) Prior Publication Data

US 2005/0127091 A1 Jun. 16, 2005

Related U.S. Application Data

(60) Provisional application No. 60/518,376, filed on Nov. 7, 2003.

(51) Int. Cl.
*F16L 27/12* (2006.01)
*F04B 39/08* (2006.01)

(52) U.S. Cl. ....................... 285/302; 285/101; 285/904; 417/547

(58) Field of Classification Search ................. 285/298, 285/302, 303, 90, 100, 101, 107, 145.1, 145.4, 285/191, 904; 417/547; 403/359.1, 359.2, 403/359.3
See application file for complete search history.

(56) References Cited

U.S. PATENT DOCUMENTS 289,288 A * 11/1883 Marshall ..................... 417/547
847,785 A * 3/1907 Kleineberg ................. 417/262
1,579,129 A * 3/1926 Murphy ...................... 285/302
2,812,129 A * 11/1957 Adams ....................... 417/546
3,006,665 A * 10/1961 Harris ....................... 285/302
3,291,442 A * 12/1966 Cranage ................. 251/149.1
3,415,285 A * 12/1968 Torp .......................... 138/94.3
3,605,563 A * 9/1971 Parrett ......................... 91/462
3,752,505 A * 8/1973 Stout ............................. 285/5
3,791,624 A * 2/1974 Payson ....................... 254/212
4,108,476 A * 8/1978 Krupp ......................... 285/47
4,435,132 A 3/1984 Haesloop et al.
4,437,688 A * 3/1984 Kramer et al. ................ 285/95
4,807,262 A * 2/1989 Shields ....................... 376/203
4,976,282 A * 12/1990 Kubala ....................... 137/580
5,865,605 A 2/1999 Weidlein
6,059,323 A * 5/2000 Ekholm et al. .............. 285/224
6,065,947 A * 5/2000 Wu ............................ 417/526
6,632,073 B2 10/2003 Newcomer
6,802,701 B2 * 10/2004 Noh et al. ................... 417/552
6,866,042 B2 3/2005 Izuchukwu

* cited by examiner

*Primary Examiner*—James M Hewitt
(74) *Attorney, Agent, or Firm*—Knobbe, Martens, Olson & Bear, LLP

(57) ABSTRACT

An apparatus for draining reservoirs includes a pump disposed in contact with a lower surface of the vessel to be drained, wherein the pump is connected to a discharge pipe inserted into the vessel through an insertion tube connected to a retrofit assembly of the vessel. The apparatus also includes seals within the insertion tube and within the discharge pipe to prevent gases from within the vessel from passing through the insertion tube and discharge pipe and into the atmosphere. An expansion joint unit attaches to the discharge pipe to prevent the rotation of the pump relative to the discharge pipe. The expansion joint unit also maintains the pump in substantial contact with the lower surface of the vessel even when thermal expansion causes the vessel to expand and the position of the discharge pipe to lift.

8 Claims, 29 Drawing Sheets

APPARATUS AND METHOD FOR DRAINING RESERVOIRS

RELATED APPLICATIONS

This application claims priority to U.S. Provisional Application No. 60/518,376, which was filed on Nov. 7, 2003, the entirety of which is hereby incorporated by reference.

BACKGROUND OF THE INVENTIONS

1. Field of the Inventions

The present embodiments generally relate to systems and methods for draining reservoirs, and more particularly, pump assemblies for draining large reservoirs of cryogenic liquids.

2. Description of the Related Art

In the art cryogenic liquids storage, enormous storage tanks have been constructed with permanently installed high-volume pumps. For example, in the art of utility-scale liquid natural gas storage, storage tanks have been constructed with a diameter of approximately the size of half of a city block and with a height of about 175-feet. A schematic illustration of such a tank is illustrated in FIG. 1.

As shown in FIG. 1, a conventional liquid natural gas storage tank 10 includes an outer tank wall 12 including a generally cylindrical sidewall 14, a flat bottom 16, and a domed top 18. The bottom 16 can be placed on the ground or can be suspended above the ground by pylons 20.

Within the outer tank wall 12, an inner vessel 22 is defined by an inner tank sidewall 24 and a bottom wall 26. The sidewall 24 can be generally cylindrical in shape, corresponding to the shape of the outer wall 14. Similarly, the bottom wall 26 can be flat corresponding with the shape of the lower wall 16.

The upper end of the inner vessel 22 is open. A lid assembly 28 typically is suspended from the domed top 18 by a plurality of struts 30. A seal 32 extends between the lid assembly 28 and the sidewall 24 of the vessel 22. As such, the vessel 22 is sealed, and thus can store a fluid therein. In the illustrated tank 10, the fluid within the vessel 22 includes some liquid natural gas LNG and gaseous natural gas GNG above the liquid natural gas LNG.

Between the outer tank wall 12 and the inner vessel 22, insulation typically is disposed. For example, between the lower walls 16, 26, a rigid insulation 34 typically is disposed. Additionally, a lighter or fluffier insulation 36 can be disposed between the lateral walls 14, 24. Additional insulation can be disposed within the lid assembly 28. Insulated as such, the tank 10 can better maintain the fluid within the vessel 22 at the desired temperature. In the art of the storage of cryogenic liquids, it is desirable to maintain the fluid at a temperature at which the liquid state of the liquid can be maintained. For example, with liquid natural gas LNG, the vessel 22 can be maintained at approximately −260° F. or lower. Other substances can be maintained in a liquid state at other temperatures.

As noted above, tanks such as the tank 10 are often extremely large. Additionally, such cryogenic liquids cannot be vacuumed out of such a tank. This is because when such a liquid is subject to a large vacuum, the liquid boils and therefore will not travel up a vacuum pipe and out of such a tank. Additionally, it is generally undesirable to provide a drain pipe at the bottom of such a tank 10. If such a drain pipe were to fail, enormous amounts of liquid material, such as liquid natural gas LNG, could spill out of such a tank 10, and thereby cause a dangerous situation. Thus, tanks such as the tank 10 typically include a pump 40 mounted near the bottom of the vessel 22 with a discharge of the pump 40 extending upwardly out of the domed top 18. In the illustrated arrangement, the discharge pipe 42 is illustrated schematically and extends to a discharge nozzle 44 above the domed top 18.

In order to provide a reasonable discharge speed of the liquid natural gas LNG, the pump 40 is quite large in size and has a high horsepower rating. Additionally, the motor 40 must be sealed and be made from a proper material to be operated in the liquid environment of the liquid natural gas LNG and at the environmental temperature of approximately −200 F. Typically, the motor 40 is suspended by the discharge pipe 42. Thus, as noted above, because the tank can be approximately 175 ft. tall, the discharge duct 42 is made from a thick, high strength material that is appropriate for a cryogenic environment. For example, the discharge pipe 42 can be made from stainless steel or aluminum.

As illustrated in FIG. 1, the discharge pipe 42 has a lower portion that can be submerged below the level of the liquid natural gas and an upper portion, adjacent the discharge nozzle 44, that is exposed to the atmosphere. Thus, the discharge pipe 42 is subject to substantial expansion, contraction, as well as thermal stresses. In order to prevent the discharge pipe 42 from contacting the lower surface 26 of the vessel 22, a clearance C is defined between the lower end of the discharge pipe 42 and the lower wall 26. In many typical tanks such as the tank 10, the clearance C can be as much as 18 to 24 inches or more.

The tank 10 also includes an instrumentation assembly 50. The instrumentation assembly 50 includes an instrument guide duct 52 extending through the domed top 18 and the lid assembly 28 into the vessel 22, a valve 54, an instrument head 56, and at least one instrument 58 configured to detect a state of the material within the vessel 22.

The instrument guide tube 52 can be made from any material. However, typically, the instrument guide tube 52 is made from a stainless steel pipe having an inner diameter of between 5-½ inches and 10 inches. The instrument 58 is suspended from the instrument head 56 by a cable 60. The instrument head 56 can include a winch 62 configured to raise and lower the instrument 58 through the instrument guide tube 52. The valve 54 can be configured to allow the instrument 58 to be retracted entirely into the instrument head 56. For example, the valve 54 can be a “gate” type valve. With such a valve, when the valve is open, the passage extending through the valve 54 is completely open through the entire bore through the valve 54. Alternatively, the valve 54 can be a butterfly-type valve. With a butterfly-type valve, when such a valve is open, the pivot shaft and valve plate remain within the bore of the valve 54, thereby partially obstructing the passage therethrough.

When a tank such as the tank 10 reaches the end of its useful life, it is typically emptied of liquid natural gas LNG and subsequently decommissioned and/or disassembled. Initially, the liquid natural gas LNG will be pumped out of the vessel 22 by the existing pump 40. However, as noted above, the resulting clearance C prevents the pump 40 from reaching residual liquid natural gas RLNG at the bottom of the vessel 22. Because the clearance C can be large, as noted above, the volume of residual liquid natural gas RLNG can be quite large.

One way to remove the residual liquid natural gas is to allow it to evaporate out of the tank through existing plumbing. Typically, it can take approximately three months to allow such a volume of residual liquid natural gas LNG to evaporate out of the tank 10. Additionally, such an evaporation process must be monitored to ensure public safety. Thus, the process of decommissioning a tank, such as the tank 10, can be a long process.

SUMMARY OF THE INVENTION

In accordance with one aspect of at least one of the inventions disclosed herein, an expansion joint unit is provided comprising a pipe member, a movable connector, a fixed connector, and an anti-rotation device. The movable connector is movably disposed at one end of the pipe member and defines an opening therethrough. The fixed connector is disposed at an opposite end of the pipe member in a substantially fixed position relative to the pipe member and also defines an opening therethrough. The anti-rotation device is disposed in the pipe member, connects to the fixed connector, and comprises an opening therethrough. The anti-rotation device is configured to substantially prevent the rotation of the fixed connector relative to the movable connector.

In another aspect of at least one invention disclosed herein, a retrofit pump assembly for draining a reservoir is provided. The retrofit pump assembly comprises an adapter member configured for attachment to a vessel housing a fluid and an insertion tube sized for insertion through the adapter member into the vessel. The retrofit pump assembly also comprises at least one discharge pipe that connects to the adapter member and extends through the insertion tube and into the vessel. At least one sealing assembly is also provided, wherein the sealing assembly is disposed between the discharge pipe and the insertion tube and is configured to substantially prevent fluid flow through the insertion tube. The retrofit pump assembly also comprises the expansion joint unit comprising a pipe member and a movable connector connected to the at least one discharge pipe and movably disposed within the pipe member. The expansion joint unit also comprises a fixed connector connected to a pump assembly and disposed in the pipe member in a substantially fixed position relative to the pipe member. The expansion joint unit also comprises an anti-rotation device disposed in the pipe member and configured to substantially prevent the rotation of the pump assembly relative to the at least one discharge pipe. The pump assembly is disposed proximal a lower surface of the vessel, wherein the expansion joint unit is configured to allow an expansion of the at least one discharge pipe and to maintain the pump assembly substantially proximal the lower surface of the vessel. The pump assembly is configured to pump fluid from the vessel through the discharge pipe to a desired location.

In still another aspect of at least one of the inventions disclosed herein, a method for draining a reservoir is provided. The method comprises attaching an adapter member to a vessel that houses a fluid and sealingly inserting an insertion tube through the adapter member and into the vessel. The method also comprises sealingly inserting and advancing at least one discharge pipe through the insertion tube and into the vessel to dispose a pump assembly proximal a lower surface of the vessel. The discharge pipe is connected to a movable connector of an expansion joint unit and a fixed connector of the expansion joint unit connects to the pump assembly. The method further comprises further advancing the at least one discharge pipe through the insertion tube to move the movable connector relative to the fixed connector. Fluid is then pumped from the vessel and through the expansion joint unit and the at least one discharge pipe to a desired location. The movable connector of the expansion joint unit allows an expansion of the at least one discharge pipe and maintains the pump assembly substantially proximal the lower surface of the vessel.

BRIEF DESCRIPTION OF THE DRAWINGS

The features mentioned above in the summary of the invention, along with other features of the inventions disclosed herein, are described below with reference to the drawings of the preferred embodiments. The illustrated embodiments in the figures listed below are intended to illustrate, but not to limit the inventions. The drawings contain the following additional figures

DETAILED DESCRIPTION OF THE PREFERRED EMBODIMENT

With reference to FIGS. 2-35, a prior art retrofit pump assembly 100 is described for removing residual liquid natural gas RLNG from a conventional liquid natural gas tank 10. The retrofit pump assembly 100 can be used with other types of tanks where it is desired to remove liquid from the bottom thereof. The retrofit pump assembly 100 provides particular benefits for use in large storage tanks for cryogenic liquids and thus is described in the environment of a liquid natural gas storage tank. However, it is to be understood that certain features, aspects, characteristics, and benefits of the retrofit pump assembly 100 can be achieved when used with other types of tanks.

Figure 1:
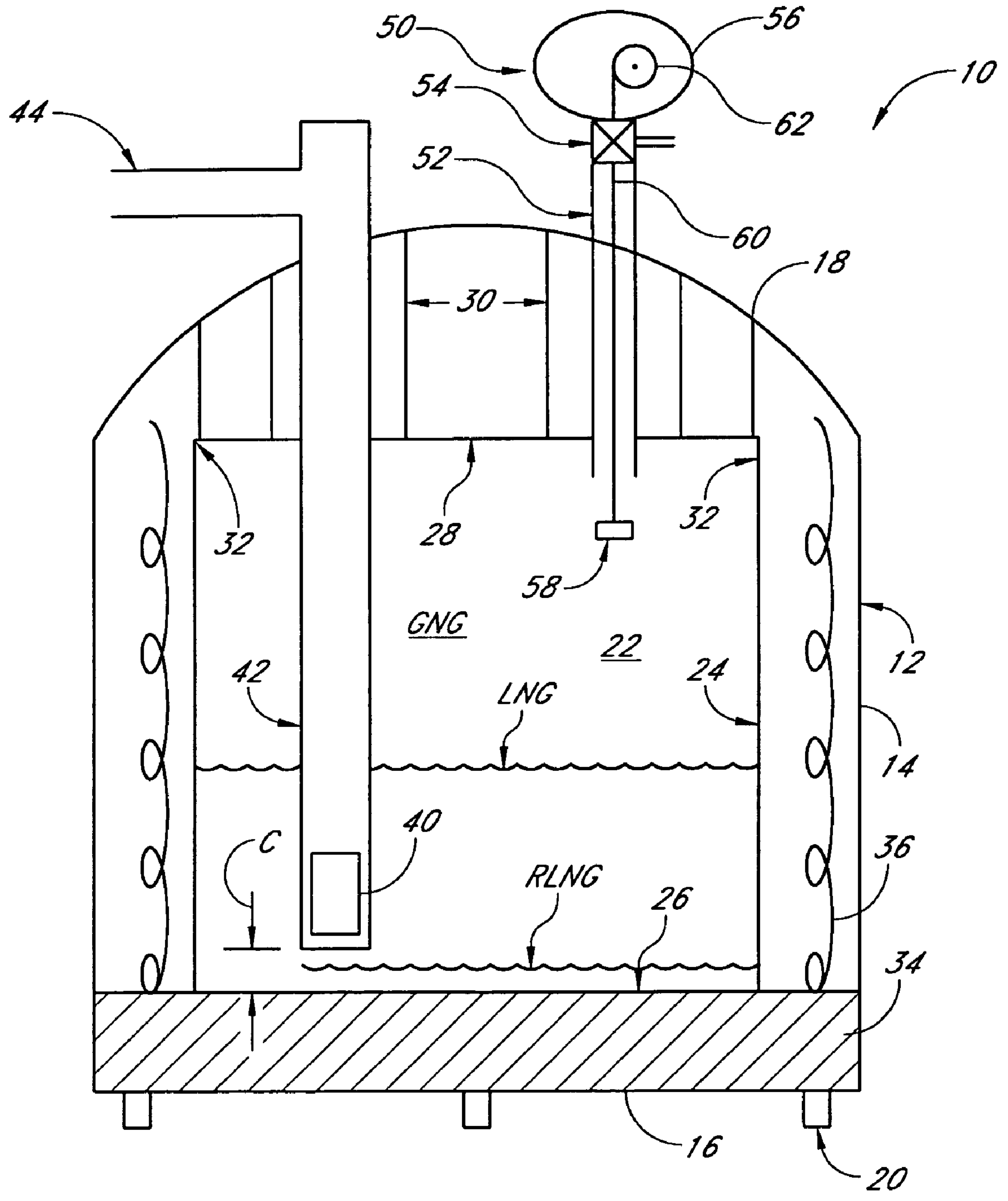
FIG. 1 (PRIOR ART)
FIG. 1 is a schematic and partial sectional view of a conventional tank for storing liquid natural gas showing a pump, a discharge pipe assembly and an instrumentation assembly.
Figure 2:
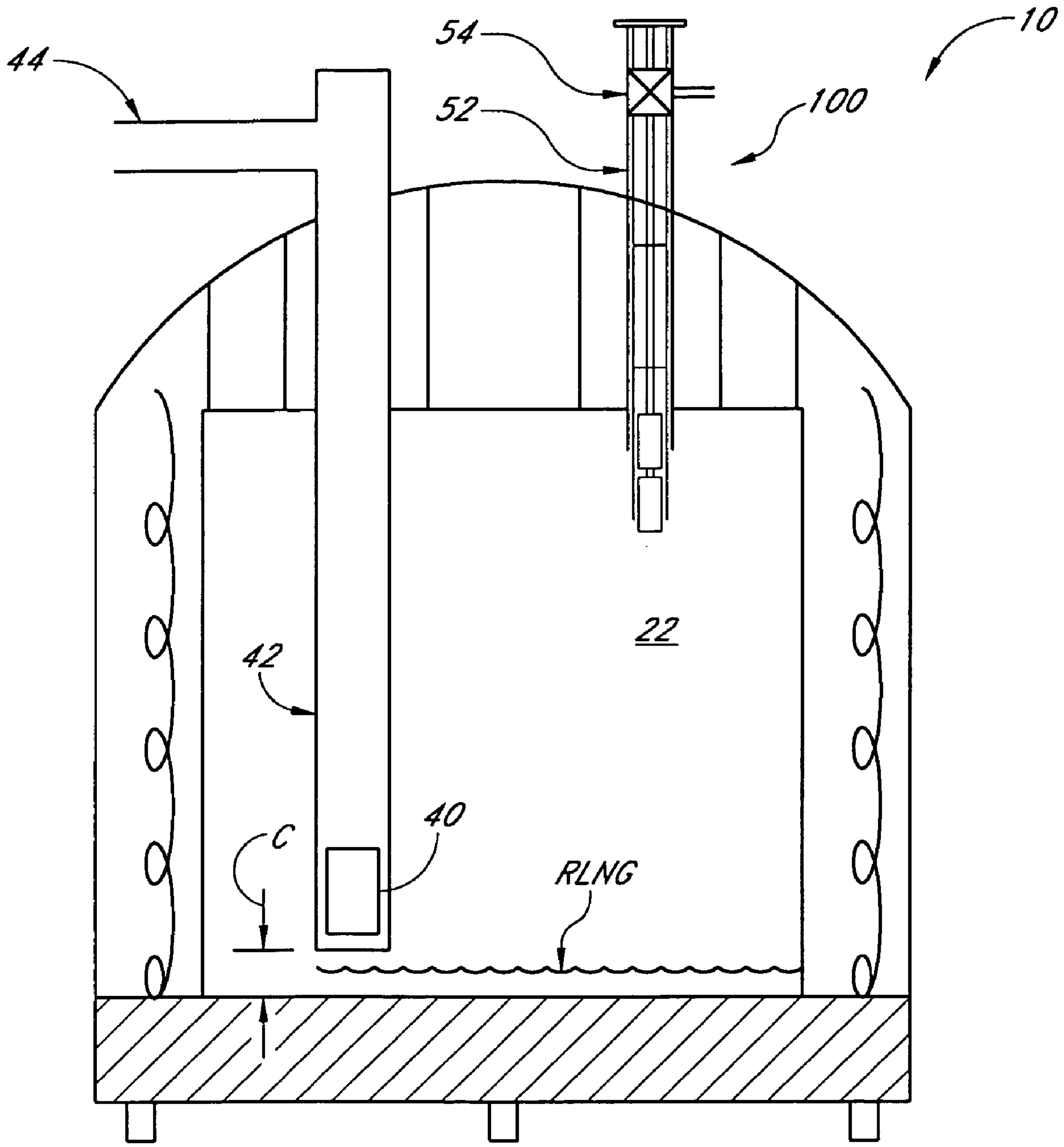
FIG. 2 is a schematic and partial sectional view of the conventional tank illustrated in FIG. 1, with the instrumentation assembly removed and with a prior art pump retrofit assembly installed thereon.

As shown in FIG. 2, the instrument assembly 50 has been removed from the valve 54 and the retrofit pump assembly 100 has been inserted through the valve 54. Where it is desired to prevent gas from exiting the vessel 22 through the guide tube 52, the valve 54 preferably is closed during the installation of the retrofit pump assembly 100.

Figure 3:
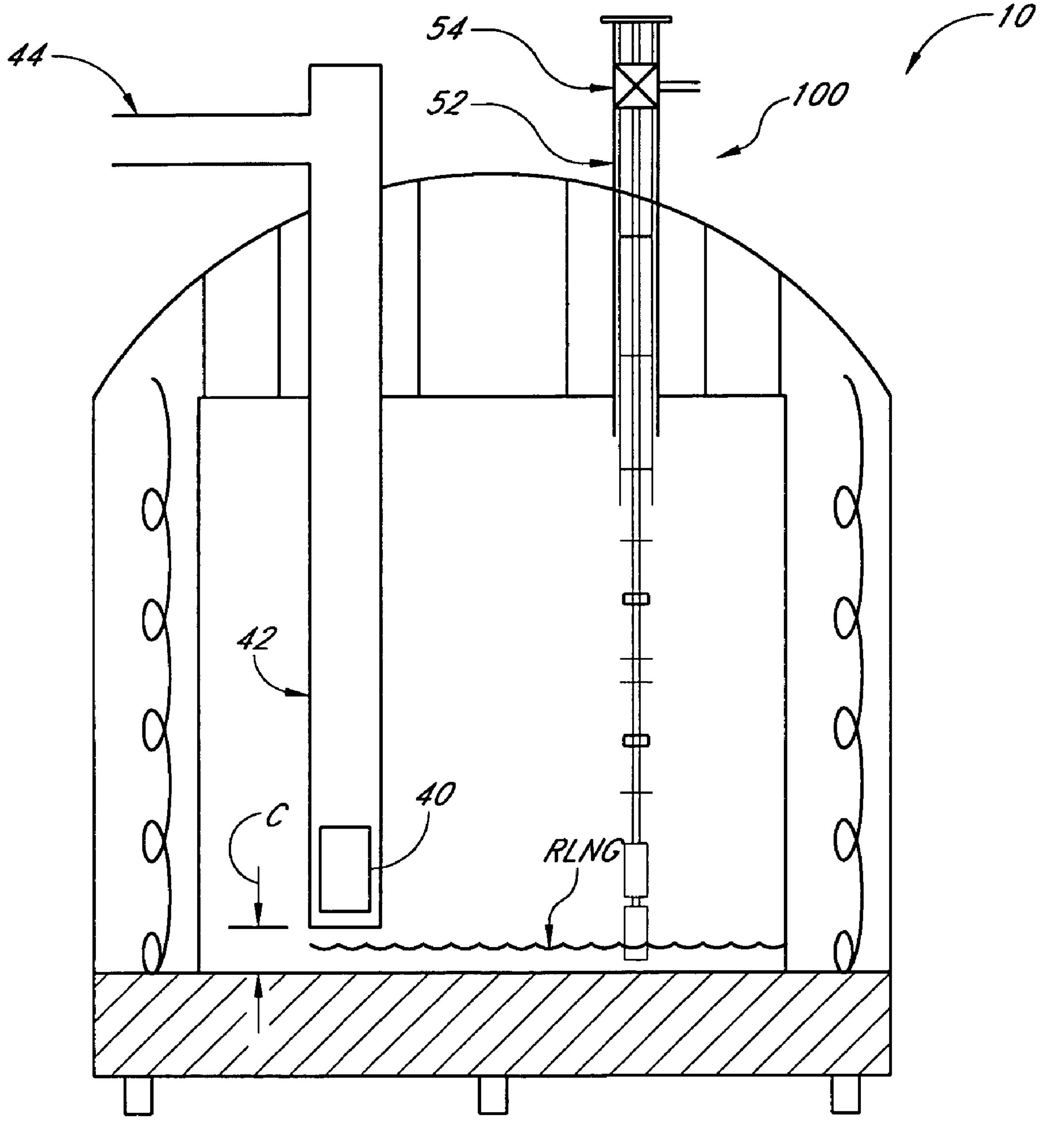
FIG. 3 is a schematic and partial sectional view of the tank and retrofit pump assembly illustrated in FIG. 2 with additional sections being added to the retrofit pump assembly so that the pump is disposed at a bottom of the tank.

After the initial portion of the pump assembly 100 is installed as shown in FIG. 2, additional sections of discharge pipe can be inserted through the valve 54 until the pump assembly at the lower end of the assembly 100 reaches the residual liquid natural gas RLNG at the bottom of the vessel 22 (See FIG. 3).

Figure 4:
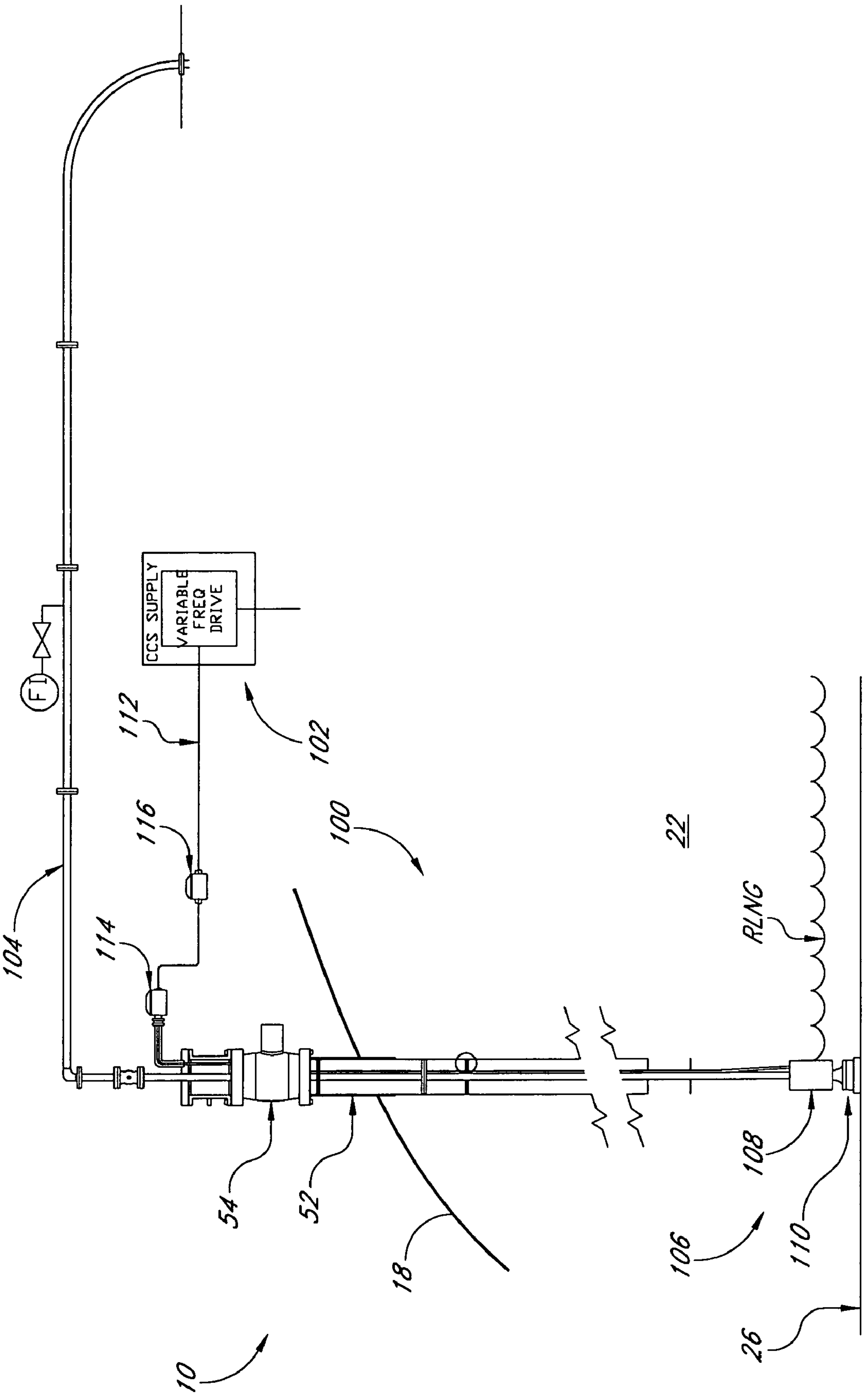
FIG. 4 is a partial schematic and sectional view of the retrofit pump assembly connected to the tank, an electronic drive for the retrofit pump, and a discharge hose for discharging liquid pumped from the tank.

FIG. 4 illustrates a further schematic representation of the retrofit assembly 100 being fully installed into the tank 10 and connected to a pump drive 102 and a discharge conduit 104 for directing liquid pumped from the tank 10 to a desired location.

FIG. 4 schematically illustrates a pump assembly 106 disposed at a lower end of the assembly 100. The pump assembly 106 includes an electric motor 108 driving a pump 110. The pump 110 is disposed below the motor 108 so as to achieve a lowest possible position within the tank 10 adjacent the bottom wall 26 of the tank 10. As such, the pump 110 can remove a maximum amount of residual liquid natural gas RLNG from the vessel 22. Preferably, the pump 110 includes an inducer to aid in feeding the pump 110 with liquid. Of course, any suitable pump 110 and motor 108 can be used.

The size and capacity and performance of the pump 110 and motor 108 will depend on the size of the guide tube 52, the type of valve 54, (i.e., full bore, such as reciprocating ball or gate-type valve, or obstructed flow, e.g., butterfly-type valve), the height of the tank 10, the type of liquid to be pumped from the vessel 22, and the desired flow rate. For certain typical liquid natural gas applications, the pump 110 and motor 108 preferably are configured to deliver 20 gallons per minute at 180 ft. of head. However, this is merely an exemplary pump capacity. Other pump capacities can be used depending on the desired speed.

The motor drive 102 is a variable frequency drive. However, this is merely one type of drive that can be used for a particular electric motor 108. Other types of motors 108 can be used and other types of drives 102 can be used. It is to be noted that an electrical conduit 112 extending from the drive 102 to the electric motor 108 should be sealed in accordance with normal techniques well known in the art for preventing gases or liquids from traveling between the insulation of the conduit 112 and the electrical conductor extending therethrough and thereby flowing out of the tank 10 and into the junction boxes, e.g., junction boxes 114, 116, or into the drive 102.

Figure 5:
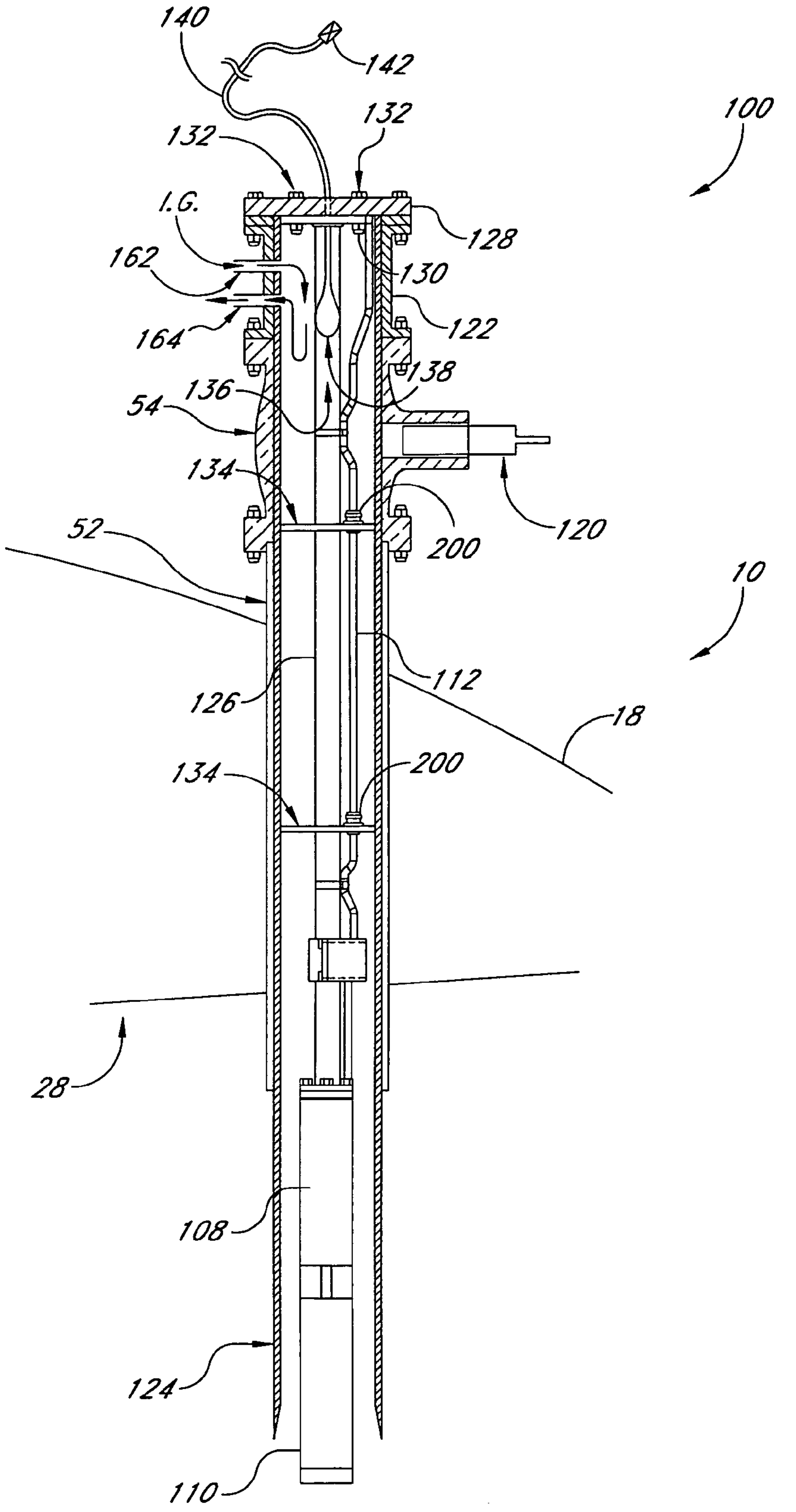
FIG. 5 is an enlarged, schematic, and partial sectional view of the retrofit pump assembly illustrated in FIG. 2 including an adapter mounted on the valve existing on the tank, an insertion tube extending from the adapter into the tank, a discharge pipe extending through the insertion tube with a pump assembly disposed at a lower end of the discharge pipe.
Figure 6:
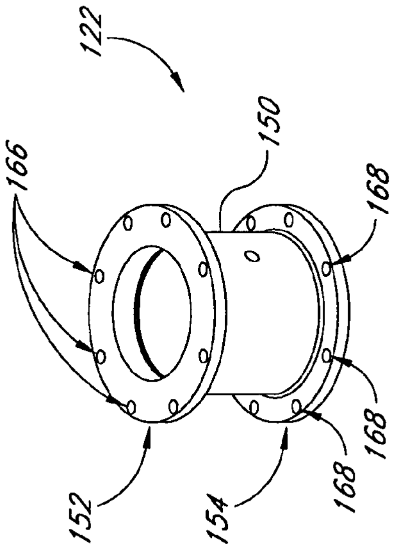
FIG. 6 is a perspective view of the adapter illustrated in FIG. 5.

FIG. 5 illustrates the retrofit assembly 100 in an initial stage of installation onto the tank 10. As shown in FIG. 5, the valve 54 is a gate-type full bore valve. Thus, the passage through the valve 54 is completely unobstructed when in an open position. A valve member 120 is illustrated in a retracted position indicating an open position of the valve 54. It is to be noted that the valve 54 is constructed in accordance with typical plumbing tolerances. Thus, the valve 54 typically will not include polished inner surfaces. Rather, the inner surfaces of the valve 54 are likely to be somewhat rough, depending on the manufacturing method used.

At its upper end, the retrofit assembly 100 includes an adapter member 122. The adapter member 122 is attached to an upper end of the valve 54. The adapter member 122 preferably includes an inner diameter that is approximately equal to that of the valve 54.

An insertion tube 124 extends through the adapter 122, the valve 54, through the instrument guide tube 52, and into the vessel 22 of the tank 10. As shown in FIG. 5, the electric motor 108 and pump 110 are connected to a discharge pipe 126. The discharge pipe 126 is fluidly connected with the pump 110 such that liquid discharged from the pump 110 travels around the electric motor 108 and into the discharge pipe 126 to be discharged upwardly out of the tank 10. Typically, such a motor will include a cooling passage allowing some of the pumped liquid to be passed along the motor for cooling purposes, as is well known in the art.

At the point in the installation of the assembly 100 illustrated in FIG. 5, the discharge pipe 126 can be secured to the insertion tube 124 with a retainer member 128. The discharge pipe 126 includes an upper flange 130 with appropriate bolt holes for receiving bolts 132 for connection to the retaining plate 128. Additional holes on the retainer 128 are connected to an upper flange of the adapter 122 and an upper flange of the insertion tube 124, described in greater detail below. As such, the assembly 100 can be inserted into the valve 54 and guide tube 52 as a single unit, i.e., the pump 110, motor 108, insertion tube 124, and discharge pipe 126 being coupled together as a unit to be inserted into the valve 54 and the guide tube 52.

The assembly 100 also includes a plurality of seal assemblies 134 configured to cooperate with the insertion tube 124 to prevent gases from within the vessel 22 from passing upwardly through the insertion tube 124 between an inner surface of the insertion tube 124 and an outer surface of the discharge pipe 126, described in greater detail below.

The discharge pipe 126 can be provided with a movable seal 136 for preventing gases from passing through the pump 110, through the discharge pipe 126 into the atmosphere. The movable seal 136 is in the form of a balloon 138 that can be inflated through an inflation conduit 140. The conduit 140 includes a valve 142 for allowing air to be pumped into the balloon 138, causing the balloon 130 to expand against the inner surfaces of the discharge pipe 126, thereby forming a seal to prevent gases in the vessel 22 from passing therethrough. In the illustrated environment of a liquid natural gas vessel, the pressures within the tank 10 are relatively low, i.e., 1 to 2 pounds per square inch. Thus, the balloon 138 can be sized and configured to provide sufficient anchoring force against such a pressure while disposed within the discharge pipe 126.

Figure 9:
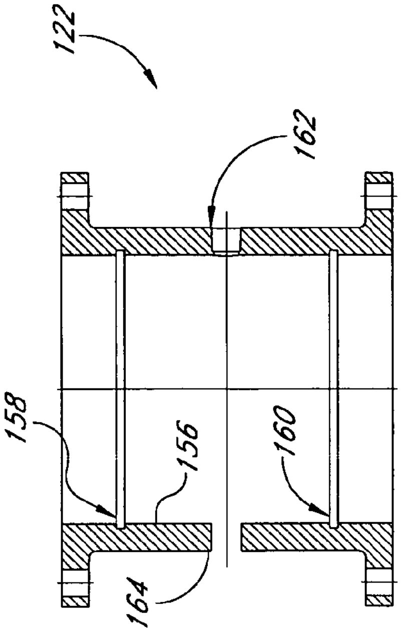
FIG. 9 is a sectional view of the adapter shown in FIG. 8 taken along line 9-9.
Figure 7:
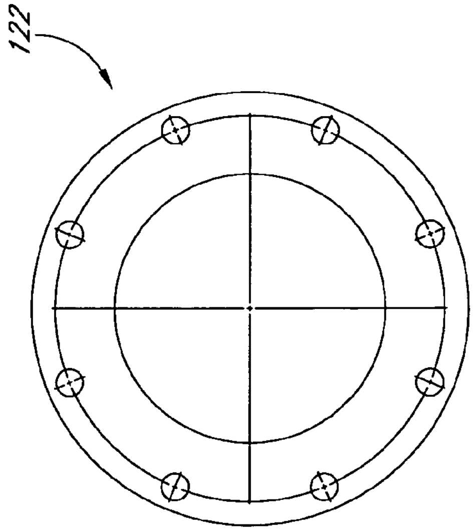
FIG. 7 is a top plan view of the adapter illustrated in FIG. 6.
Figure 8:
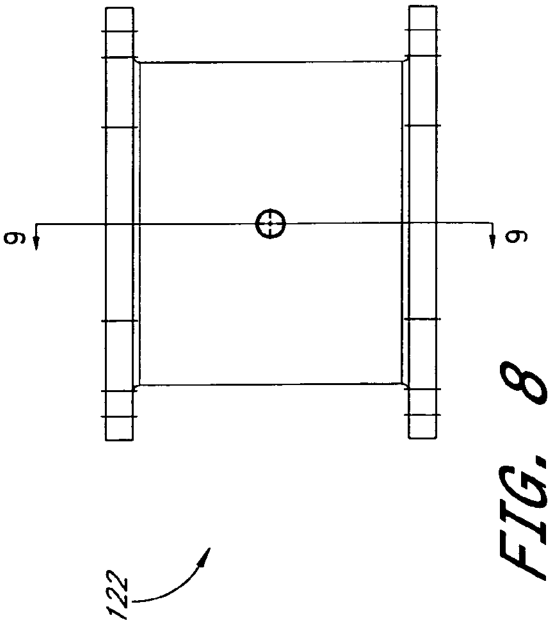
FIG. 8 is a side elevational view of the adapter illustrated in FIG. 6.

With reference to FIGS. 6-9, the adapter 122 is described in greater detail. The adapter 122 includes a pipe section 150, an upper flange 152, and a lower flange 154. The pipe section 150 can be formed from standard pipe having an inner diameter approximately equal to the inner diameter of the valve 54. With reference to FIG. 9, the inner surface 156 of the adapter 122 is configured to provide a seal with an outer surface of the insertion tube 124 (FIG. 5). As such, the adapter 122 and the insertion tube 124 cooperate to prevent gas within the vessel 22 from passing upwardly between the outer surface of the insertion tube 124 and the inner surface 156 of the adapter 122.

The adapter 122 includes an upper O-ring groove 158 and a lower O-ring groove 160. However, this is merely one type of sealing structure that can be provided on the inner surface 156 of the adapter 122. Other types of seals can also be used. Where the upper and lower O-ring grooves 158, 160 are used to form a seal with the outer surface of the insertion tube 124, the O-ring grooves 158, 160 and the O-rings used therewith are chosen based on the environment of use, as is well known in the art. As noted above, the pressure within the vessel 22 can be quite low in certain environments, such as the typical pressure used in liquid natural gas containers of about 1 to 2 psi. A single O-ring groove can also be used.

A further advantage is provided where the adapter 122 is configured to allow the assembly 100 to be flushed. For example, the adapter 122 can be configured to allow a non-reactive gas to be circulated within at least a portion of the assembly 100 to ensure that any leak of a gas from the vessel 22 is diluted as quickly as possible as it travels up through the assembly 100.

The adapter 122 includes an inlet 162 and an outlet 164. The inlet and outlet 162, 164 can be connected to an inert gas circulation system (not shown). Such a circulation system can be used to circulate an inert gas, such as, for example, but without limitation, nitrogen gas, into the space between the inner surface of the insertion tube 124 and the outer surface of the discharge pipe 126. For example, as shown in FIG. 5, an inert gas IG flows into the adapter 122 through the inlet 162, circulates within a space between the inner surface of the insertion tube 124 and an outer surface of the discharge pipe 126, and is then discharged through the outlet 164 of the adapter 122. As such, by filling the space between the outer surface of the discharge pipe 126, the inner surface of the insertion tube 124, and the space above the upper-most seal 134, any natural gas that may leak into the space is immediately diluted with the inert gas, thereby reducing the ignition potential of said gas as quickly as possible.

With reference again to FIGS. 6-9, the adapter 122 also includes a plurality of bolt holes 166 on the upper flange 152 and a plurality of bolt holes 168 on the lower flange 154. The bolt holes 166, 168 are configured to provide a means for attaching the adapter 122 to the valve 54 as well as other devices, including the insertion tube 124 and the retainer 128.

Figure 10:
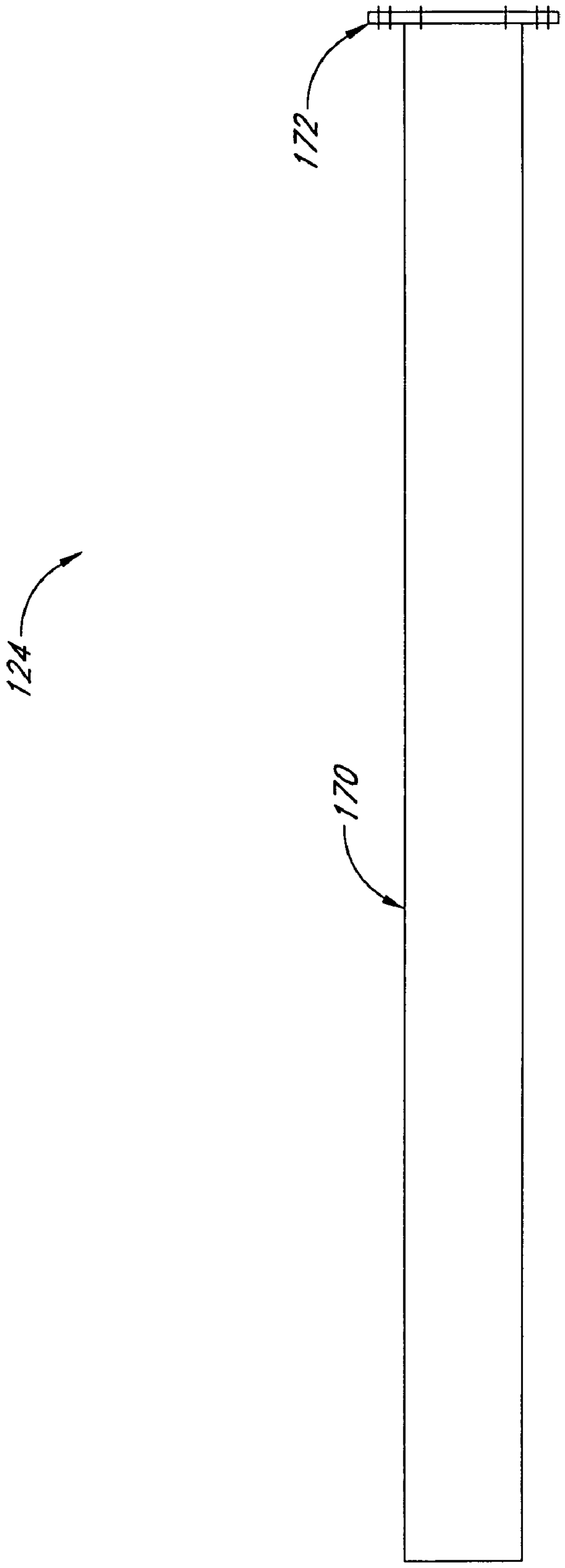
FIG. 10 is a side elevational view of the insertion tube illustrated in FIG. 5.

With reference to FIG. 10, the insertion tube 124 includes a pipe section 170 and a mounting flange section 172. The pipe section 170 can be formed from any type of material suitable for the environment in which it is used. The insertion tube 124 is used in a liquid natural gas environment. Thus, the material of the insertion tube 124 should be appropriate for a cryogenic environment, which can be as cold as −260° F. Thus, for example, the pipe section 170 can be made from stainless steel or aluminum, or numerous other materials as is well known in the art.

In order to provide the desired seal with the inner surface 156 of the adapter 122, and the O-rings provided in the grooves 158, 160, the outer surface of the pipe section 170 should be polished as smooth as practicable.

Figure 12:
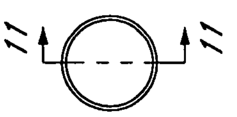
FIG. 12 is a top plan view of the insertion tube illustrated in FIG. 11.
Figure 11:
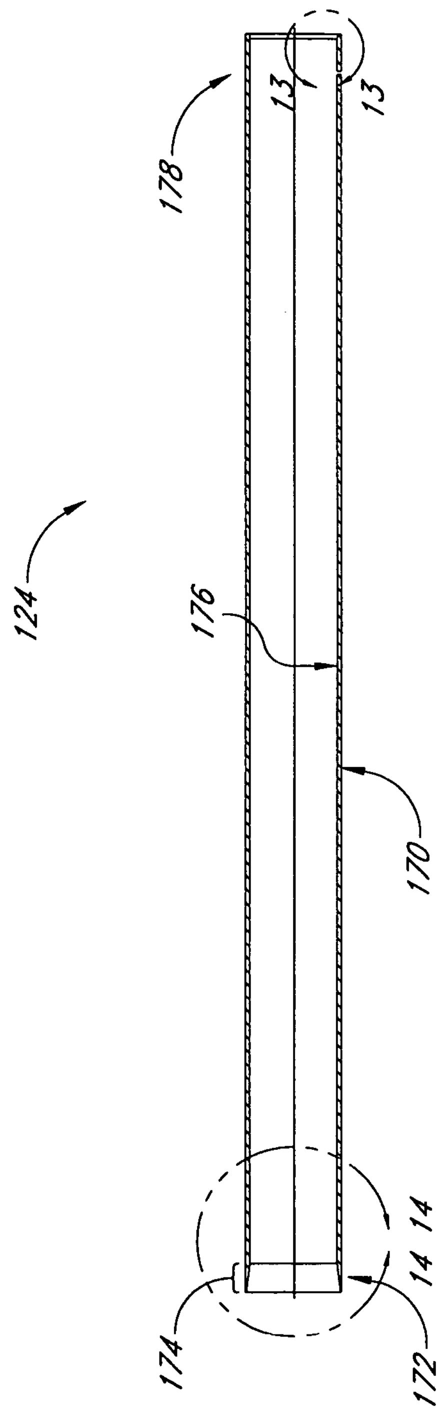
FIG. 11 is a sectional view of the insertion tube illustrated in FIG. 10 with the mounting flange removed.
Figure 13:
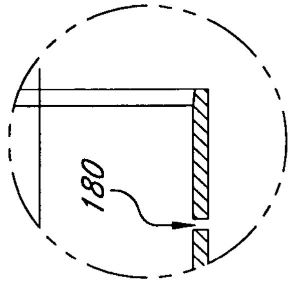
FIG. 13 is an enlarged sectional view of the portion of the insertion tube identified by the circle 13 in FIG. 11.
Figure 14:
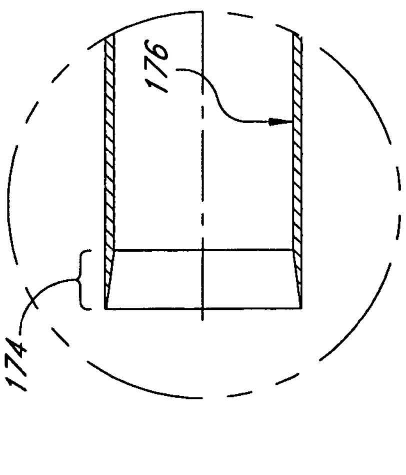
FIG. 14 is an enlarged portion of the insertion tube identified by the circle 14 in FIG. 11.

With reference to FIGS. 12-14, sectional views of the insertion tube 124 are illustrated therein. As shown in FIGS. 11 and 14, a lower end 172 of the pipe section 170 includes a tapered area 174. The tapered portion 174 comprises an area of reducing thickness along an inner surface 176 of the insertion tube 124. This provides an additional advantage when removing the discharge pipe 126 from the insertion tube 124.

With reference again to FIG. 11, at an upper end 178 of the pipe section 170, an aperture 180 is disposed for allowing circulation of an inert gas as described above with reference to FIG. 5.

Figure 16:
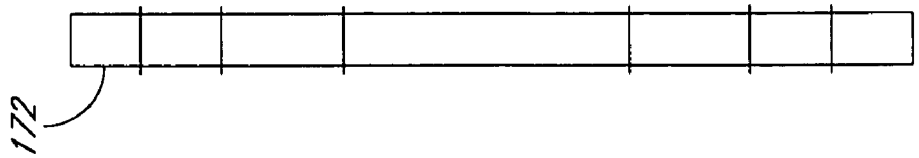
FIG. 16 is a side elevational view of the mounting flange illustrated in FIG. 15.
Figure 15:
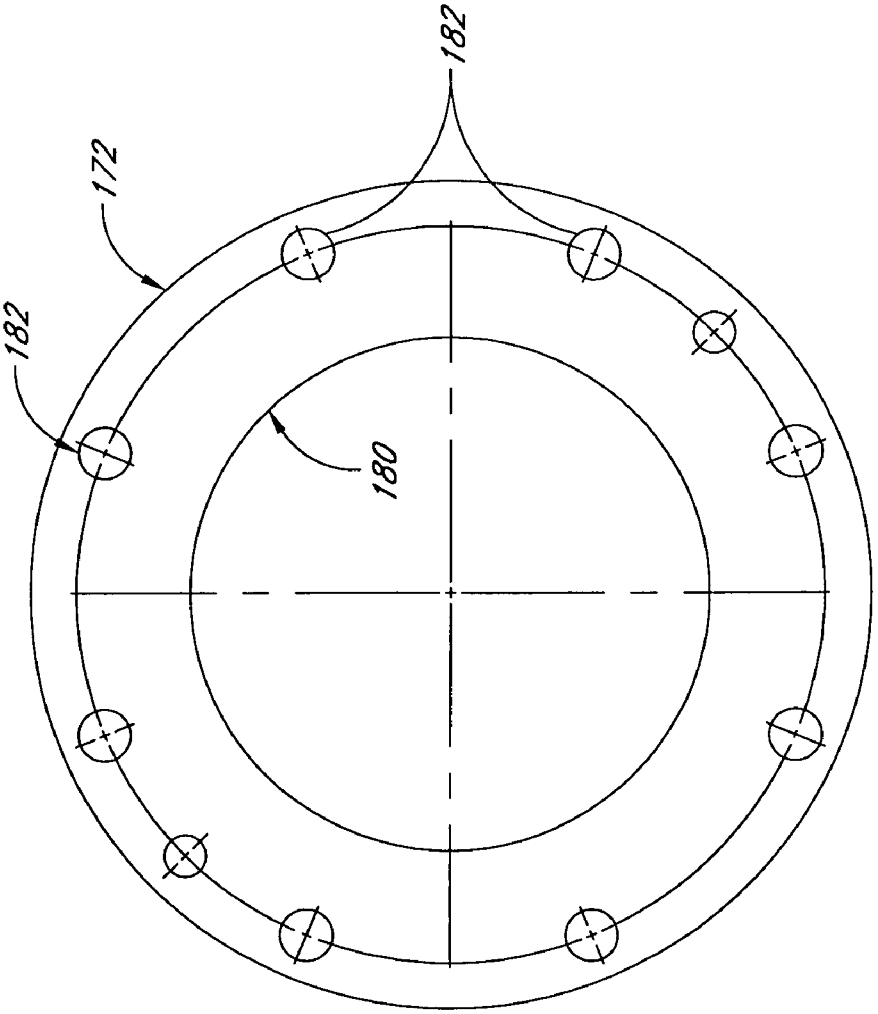
FIG. 15 is a top plan view of the mounting flange of the insertion tube illustrated in FIG. 10.
Figure 17:
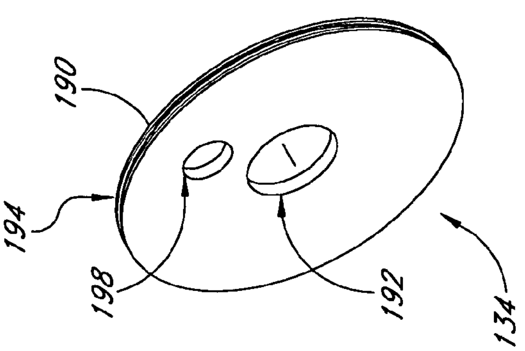
FIG. 17 is a perspective view of a sealing disk mounted on the retrofit pump assembly illustrated in FIG. 5.
Figure 19:
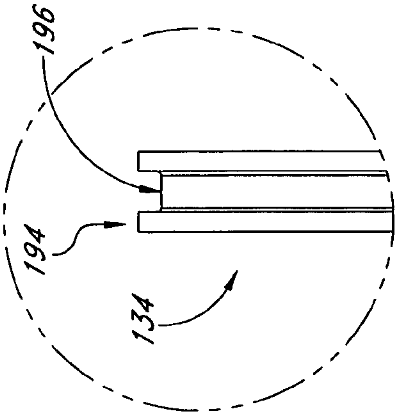
FIG. 19 is an enlarged view of the portion of the sealing disk of FIG. 18 identified by the circle 19.
Figure 18:
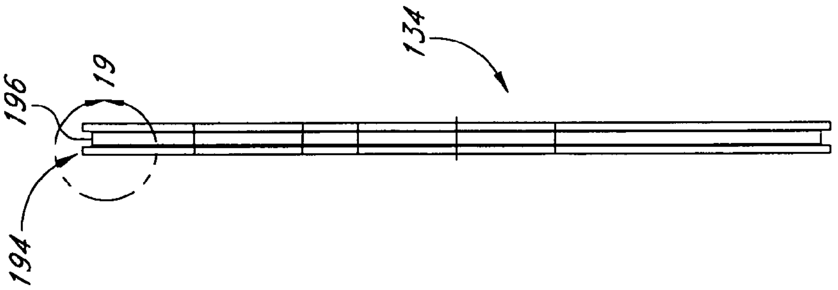
FIG. 18 is a side elevational view of the sealing disk illustrated in FIG. 17.

With reference to FIGS. 15 and 16, the flange portion 172 of the insertion tube 124 includes a central aperture 180 in a plurality of bolt holes 182. The upper end 178 of the pipe section 170 can be connected to the aperture 180 through any appropriate means. For example, the upper end 178 can be connected to the aperture 180 with an interference fit. Alternatively, or in addition, the upper end 178 can be connected to the aperture 180 through bonding, welding, adhesives, and the like. The bolt holes 182 are configured to be aligned with the bolt holes 166 of the upper flange 152 of the adapter 122. Additionally, a lower facing surface of the flange 172, i.e., the surface of the flange 172 that abuts against the flange 152, can include a seal, e.g., a gasket, for creating a seal against the flange 152.

Figure 20:
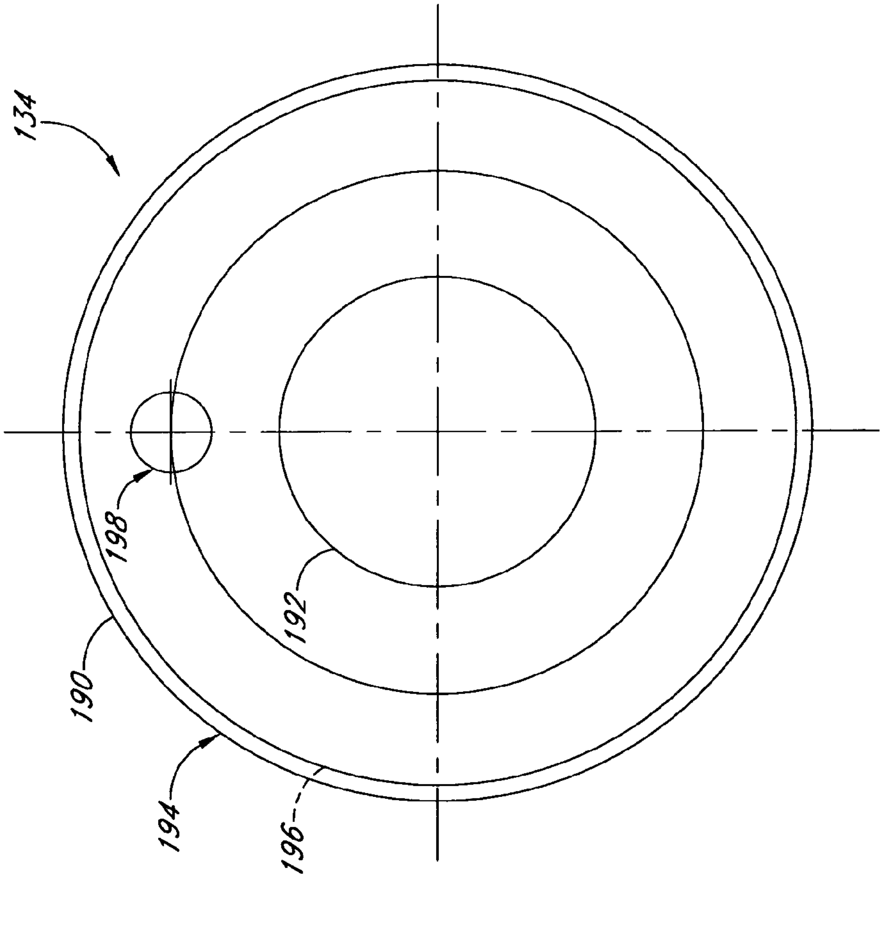
FIG. 20 is a top plan view of the sealing disk illustrated in FIG. 17.

As noted above with reference to FIG. 5, the assembly 100 includes seals 134 for defining seals between the outer surface of the discharge pipe 126 and the inner surface of the insertion tube 124. As shown in FIG. 20, the seals 134 comprise a disk member 190, having a central aperture 192, and an outer circumferential edge 194 that is configured to define a seal with the inner surface 176 of the insertion tube 124. The outer peripheral edge 194 includes an O-ring groove 196 configured to cooperate with an O-ring (not shown) for forming an appropriate seal against the inner surface 176 of the insertion tube 124 with sufficient sealing strength to prevent the subject gas from leaking there-past.

The central aperture 192 is configured to form a sealing engagement with the outer surface of the discharge pipe 126. The central aperture 192 can be sized to form an interference fit with the outer surface of the discharge pipe 126. Alternatively, the central aperture 192 can be provided with a clearance with the outer surface of the discharge pipe 126 and then welded thereto with a continuous weld so as to form a gas tight seal.

A further advantage is provided where the disk member 190 includes an accessory aperture 198. The aperture 198 is sized to allow an electrical conduit to pass therethrough. The aperture 198 is configured to allow the electrical conduit 112 to pass therethrough (See FIG. 5). Optionally, the aperture 198 can be further sized to accept a sealing grommet for providing a seal between the inner surface of the aperture 198 and the outer surface of the conduit 112. For example, as shown in FIG. 5, grommets 200 are illustrated as extending through the seals 134. These grommets 200 extend through the apertures 198 illustrated in FIGS. 17 and 20 so as to provide a seal between the inner surface of the aperture 198 and the outer surface of the conduit 112.

Figure 20A:
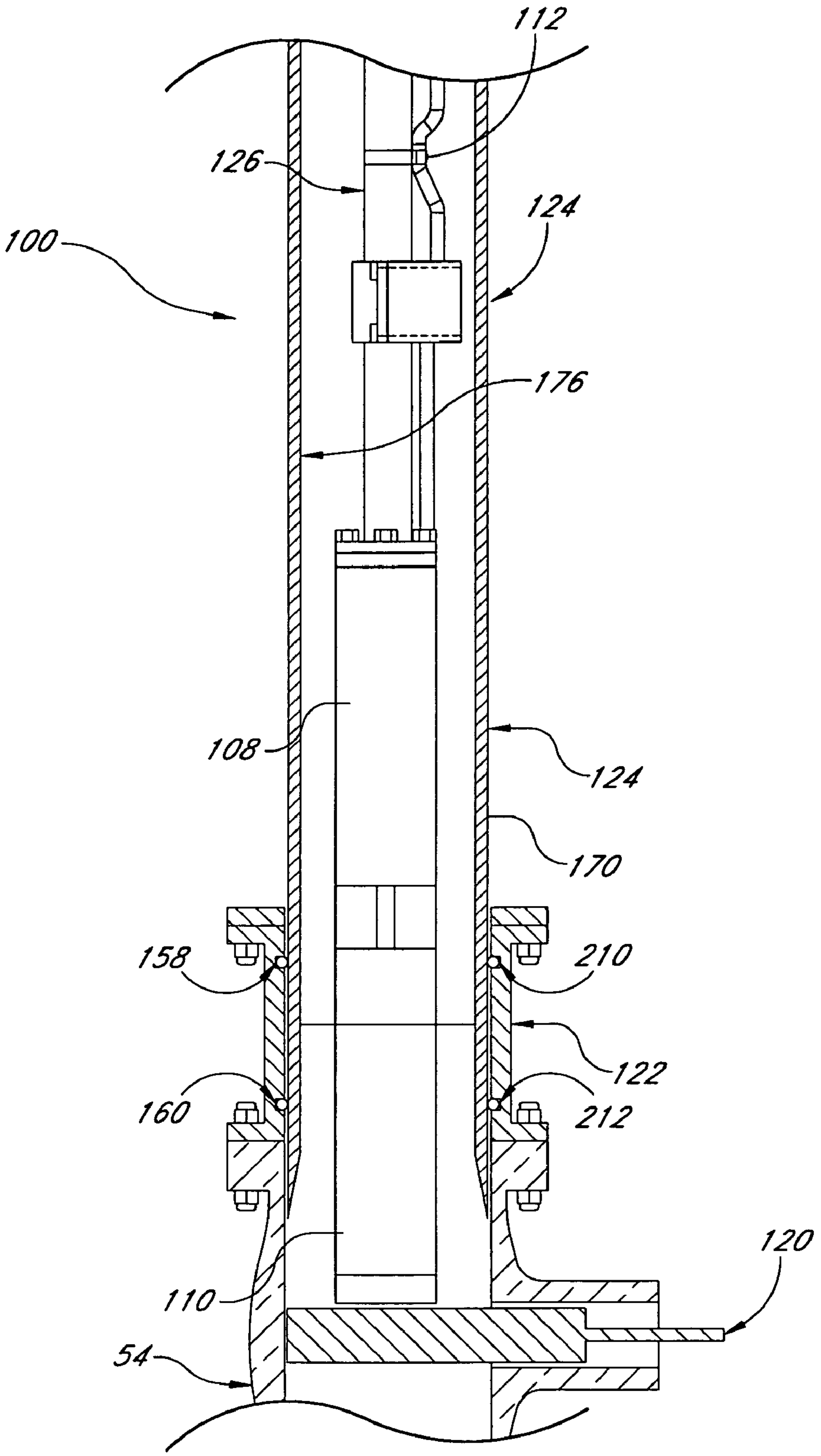
FIG. 20A is an enlarged, schematic, and partial sectional view of an initial step in installing the retrofit pump assembly into a tank.
Figure 21:
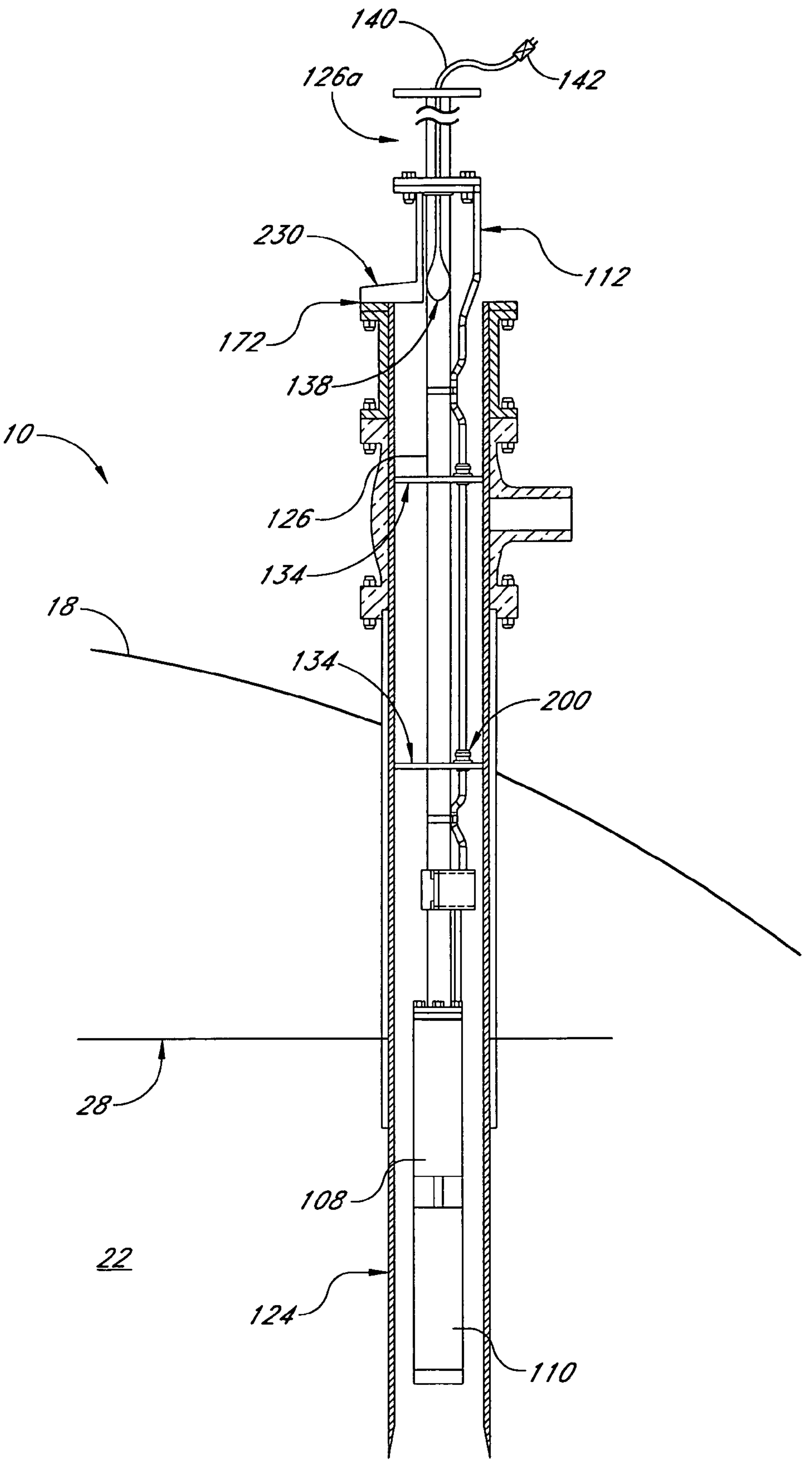
FIG. 21 is a partial sectional and side elevational view of the retrofit pump assembly illustrated in FIG. 5 with the discharge pipe having been disconnected from the adapter and pulled partially upward out of the adapter, along with a collar holding the discharge pipe in the extracted position for aiding in assembling additional discharge pipes.

With reference to FIG. 20A, an initial operation for installing the assembly 100 onto the tank 10 is illustrated therein. As shown in FIG. 20A, the valve 54 is closed such that the valve member 120 is in the deployed position and extends into the interior of the valve 54. Additionally, the adapter 122 is bolted to the upper end of the valve 54. A lower end of the assembly 100 is illustrated as extending through the adapter 122 such that the outer surface of the pipe section 170 of the insertion tube 124 contacts O-rings 210, 212 disposed in the O-ring grooves 158, 160 of the adapter 122. Thus, the outer surface of the pipe section 170 is sealed to the inner surface 156 of the adapter 122.

With reference to FIG. 5, although the assembly 100 is illustrated in a different position, it is to be noted that the seals 134 maintain a seal between the outer surface of the discharge pipe 126 and the inner surface 176 of the insertion tube 124. Finally, it is to be noted that the balloon 138 is disposed within the interior of the discharge pipe 126. With the assembly 100 positioned as such, the valve member 120 can be withdrawn from the valve 54, thereby opening the valve 54 to the interior of the vessel 122. With the valve 54 open, the assembly 100 can be slid downwardly into the guide tube 52 until it reaches the position illustrated in FIG. 5.

As noted above with reference to FIG. 11, the aperture 180 in the pipe section 170 is disposed at the upper end 178 of the insertion tube 124. Thus, with the assembly 100 in the position illustrated in FIG. 5, the inert gas IG can be injected into the inlet 162 and then be circulated within the space above the uppermost seal 134 and between the outer surface of the discharge pipe 126 and the inner surface 176 of the insertion tube 124. After any circulation of inert gas is performed, the retainer 128 can be removed. For example, with reference to FIG. 21, the retainer 128 has been removed and the discharge pipe 126 has been pulled upwardly from the insertion tube 124. Another retainer 230 is illustrated as supporting the discharge pipe 126 against the mounting flange 172 of the insertion tube 124.

As such, the retainer 230 supports the weight of the discharge pipe 126, the electric motor 108, and the pump 110. Thus, an additional discharge pipe 126A can be connected to the upper end of the discharge pipe 126. Prior to connecting the additional discharge pipe 126A to the discharge pipe 126, the air filling tube 140 can be threaded through the discharge pipe 126A. After connecting the discharge pipe 126A, the retainer 230 can be removed and the two discharge pipes 126, 126A can be lowered down into the vessel 22. During or after the discharge pipes 126, 126A have been lowered further into the insertion tube 124, the balloon 138 can be moved upwardly through the discharge pipe 126A. For example, the balloon 138 can be partially deflated by releasing some of the air from within the balloon through the valve 142. Once the balloon 138 is dislodged, the balloon 138 can be slid upwardly through the discharge pipe 126A until it reaches a position near the upper end thereof. At that point, additional air can be reinserted into the balloon 138 to secure its position and continue to provide a seal against the outflow of gas from the vessel 22.

Additionally, as the discharge pipes 126, 126A are lowered into the insertion tube 124, the inert gas IG can continuously be circulated within the spaces between the seals 134 and the outer surface of the discharge pipes 126, 126A and the inner surface 176 of the insertion tube. As such, the atmospheric air that initially is drawn into the insertion tube 124 as the discharge pipes 126, 126A are lowered into the tube 124, is continuously diluted. Of course, if desired, the discharge pipes 126, 126A can be stopped at various positions wherein the seals 134 define discrete chambers within the insertion tube 124 such that these discrete chambers are in communication with the inlet and outlet 162, 164 so as to completely dilute and refill these chambers with an inert gas. As such, the inert gas prevents any air fuel mixtures forming where the gas within the vessel 22 is a potential fuel.

It is to be noted also that the conduit 112 can be made from a single piece of conduit and continuously thread through the seals 134 and grommets 200 as additional discharge pipe sections 126, 126A are connected together. With reference to FIGS. 22-25, exemplary discharge pipes 126, 126A are illustrated therein.

Figure 22:
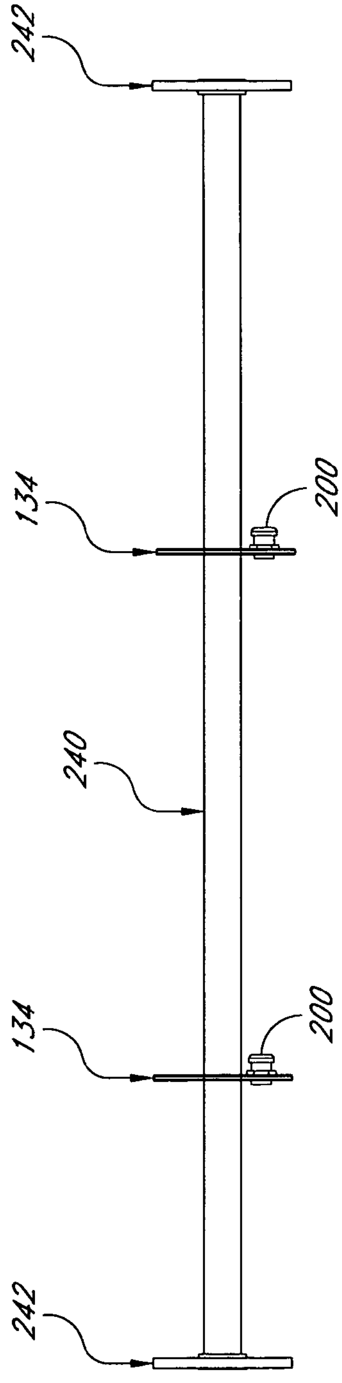
FIG. 22 is a side elevational view of additional discharge pipe sections to be connected to the discharge pipe illustrated in FIG. 21.

As shown in FIG. 22, the discharge pipes 126, 126A can comprise a commercially available one and one-half inch (1½") pipe 240. Of course, the type of pipe 240 used can be changed in accordance with the environment of use, as is well known in the art.

The discharge pipes 126, 126A also include mounting flanges 242 at both the upper and lower ends thereof. The mounting flanges 242 can comprise commercially available flanges for standard piping.

Figure 23:
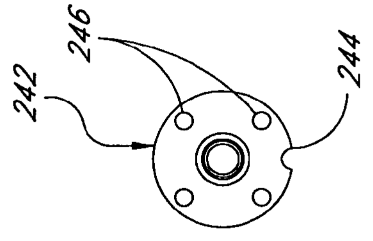
FIG. 23 is a top plan view of the discharge pipe sectional illustrated in FIG. 22.

With reference to FIG. 23, each of the flanges 242 include a notch 244 for allowing the electrical conduit 112 to extend thereby. Additionally, each of the flanges 242 include apertures 246 for receiving bolts for connecting the flanges 242 to the flanges 242 of adjacent discharge pipes 126, 126A.

Figure 24:
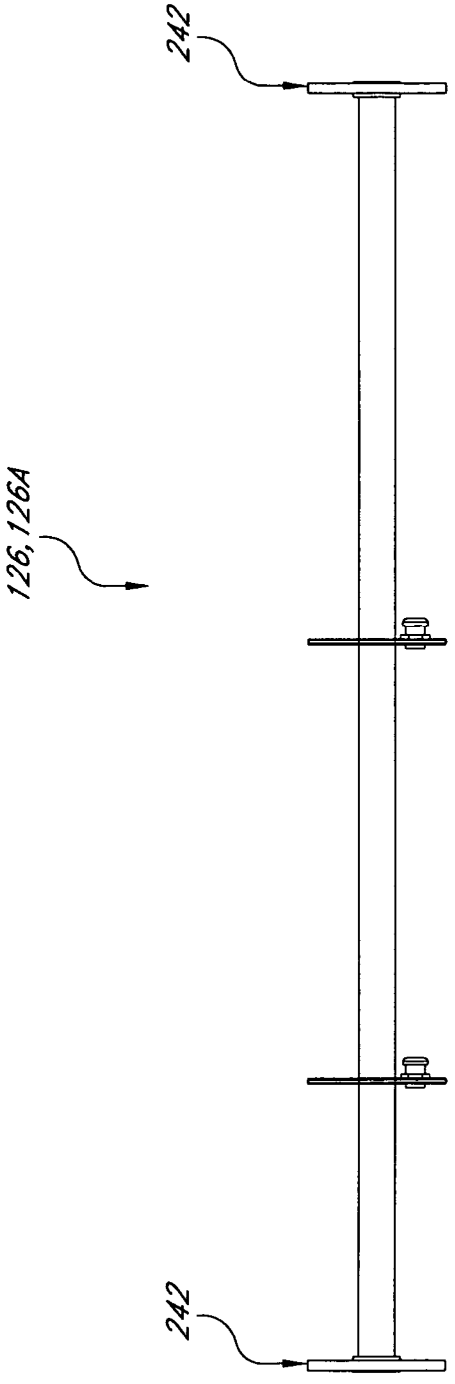
FIG. 24 is an additional discharge pipe section, having a length different from that of the discharge pipe illustrated in FIG. 22.
Figure 25:
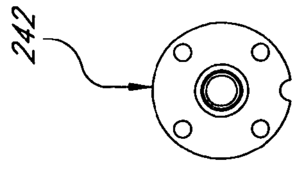
FIG. 25 is a top plan view of the discharge pipe section as illustrated in FIG. 24.

FIGS. 24 and 25 illustrate a shorter discharge pipe 126, 126A which may be used in conjunction with the longer discharge pipes 126, 126A illustrated in FIG. 22. This provides greater flexibility in installing the assembly 100 into the tank 10. For example, the discharge pipes 126, 126A illustrated in FIG. 22 can be a standard length, for example, but without limitation, 10 feet long. Thus, if it is desired to reach a depth into the tank 10 that is not a multiple of 10 feet, another size discharge pipe 126, 126A can be used to reach the final depth.

Optionally, the flanges 242 can be provided with seals similar to that of the seals 134. As such, the assembly 100 provides further sealing against the leaking of gas from the vessel 22 to the atmosphere.

Figure 26:
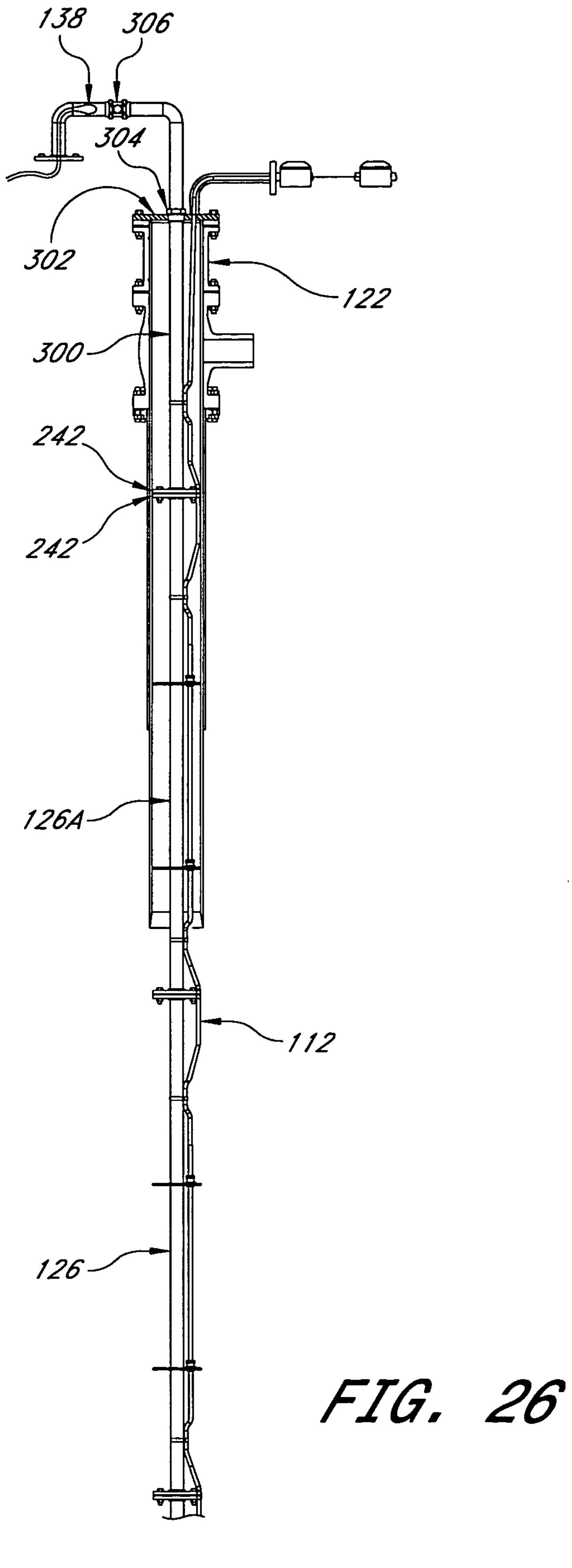
FIG. 26 is an enlarged side elevational and partial sectional view of the upper end of the retrofit pump assembly having been fully installed onto the tank 10.

With reference to FIG. 26, as the final depth is approached, a final discharge pipe assembly 300 can be connected to the top of the previously installed discharge pipe 126A. As shown in FIG. 26, a lower end of the final discharge pipe 300 includes a standard flange 242 which can be identical to the uppermost flange 242 of the discharge pipe 126A. Thus, a further description of the connection therebetween is not described further.

At its upper end, the final discharge pipe 300 can include a headplate 302 which is configured to form a complete seal over the upper flange 156 of the adapter 122. The headplate 302 can include a gland nut assembly 304 for sealing the outer surface of the final discharge pipe assembly 300 against an aperture formed in the headplate 302. As such, the final depth of the pump 110 within the tank 10 can be adjusted on site. Then, once the final depth is reached, the gland nut assembly 304 can be tightened to thereby provide a gas tight seal at the upper end of the adapter 122.

The upper end of the final discharge pipe 300 also includes a valve 306. The valve 306 can be configured to allow the balloon 138 to pass therethrough after the final discharge pipe 300 has been secured to the headplate 302. Thus, with the valve 306 open, the balloon 138 can be pulled to the position illustrated in FIG. 26 in a slightly deflated state. After the balloon has reached the position illustrated in FIG. 26, the valve 306 can be closed and the balloon 138 can be removed. As such, the balloon 138 can be used to maintain a seal of the discharge pipe assemblies during the installation process.

Figure 27:
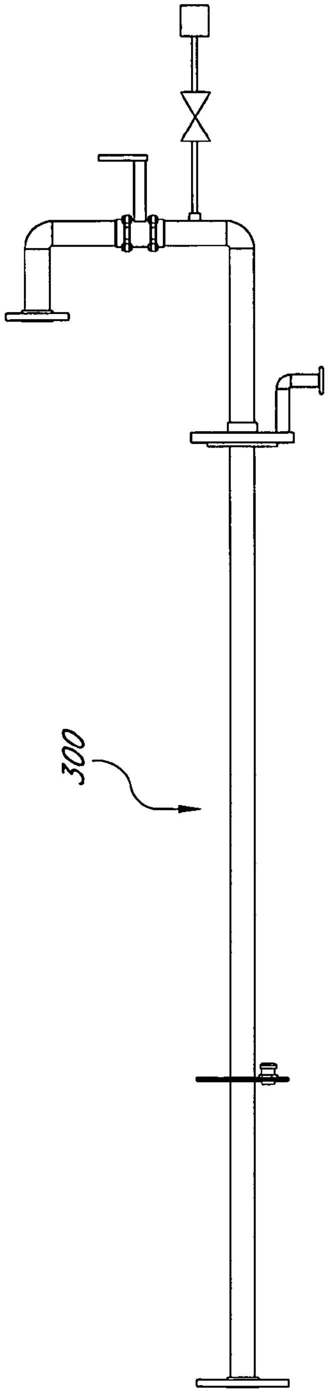
FIG. 27 is an enlarged side elevational view of the upper end of the discharge pipe illustrated in FIG. 26.
Figure 28:
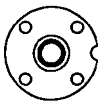
FIG. 28 is a bottom plan view of a lower flange disposed at the lower end of the discharge pipe assembly illustrated in FIG. 27.

FIGS. 27 and 28 illustrate the final discharge pipe assembly 300 in greater detail.

Figure 29:
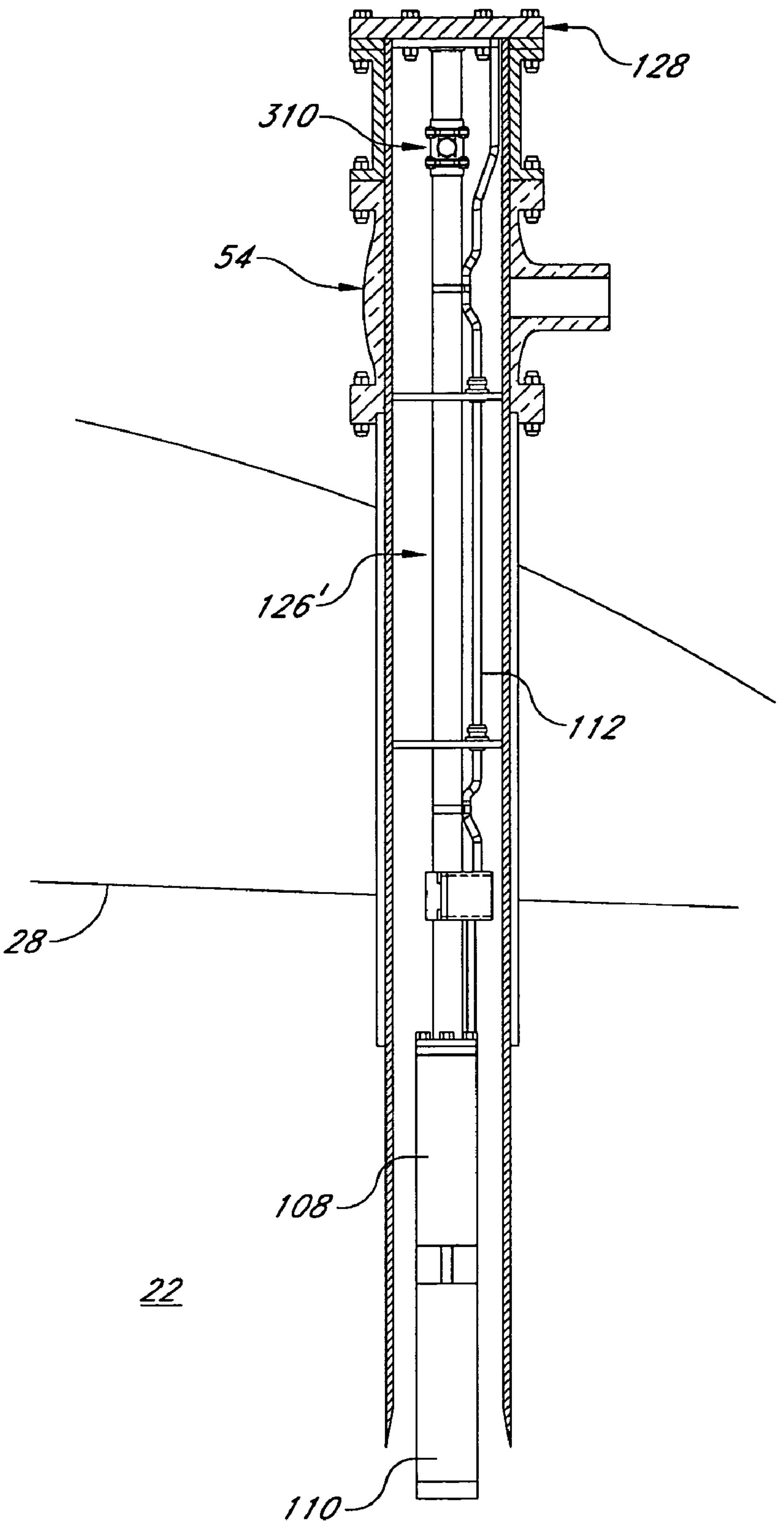
FIG. 29 is a side elevational and partial sectional view of another retrofit pump assembly.

With reference to FIG. 29, a further advantage is provided where each discharge pipe assembly 126 is provided with a valve 310 that can replace the balloon 138. For example, as shown in FIG. 29, the discharge pipe 126' includes a valve 310. The valve 310 can be any type of valve to be installed in-line along the pipe forming the discharge pipe 126'. At the stage of installation illustrated in FIG. 29, which corresponds generally to the position illustrated in FIG. 5, the valve 310 is closed. Thus, no gas from the vessel 22 can escape.

Figure 30:
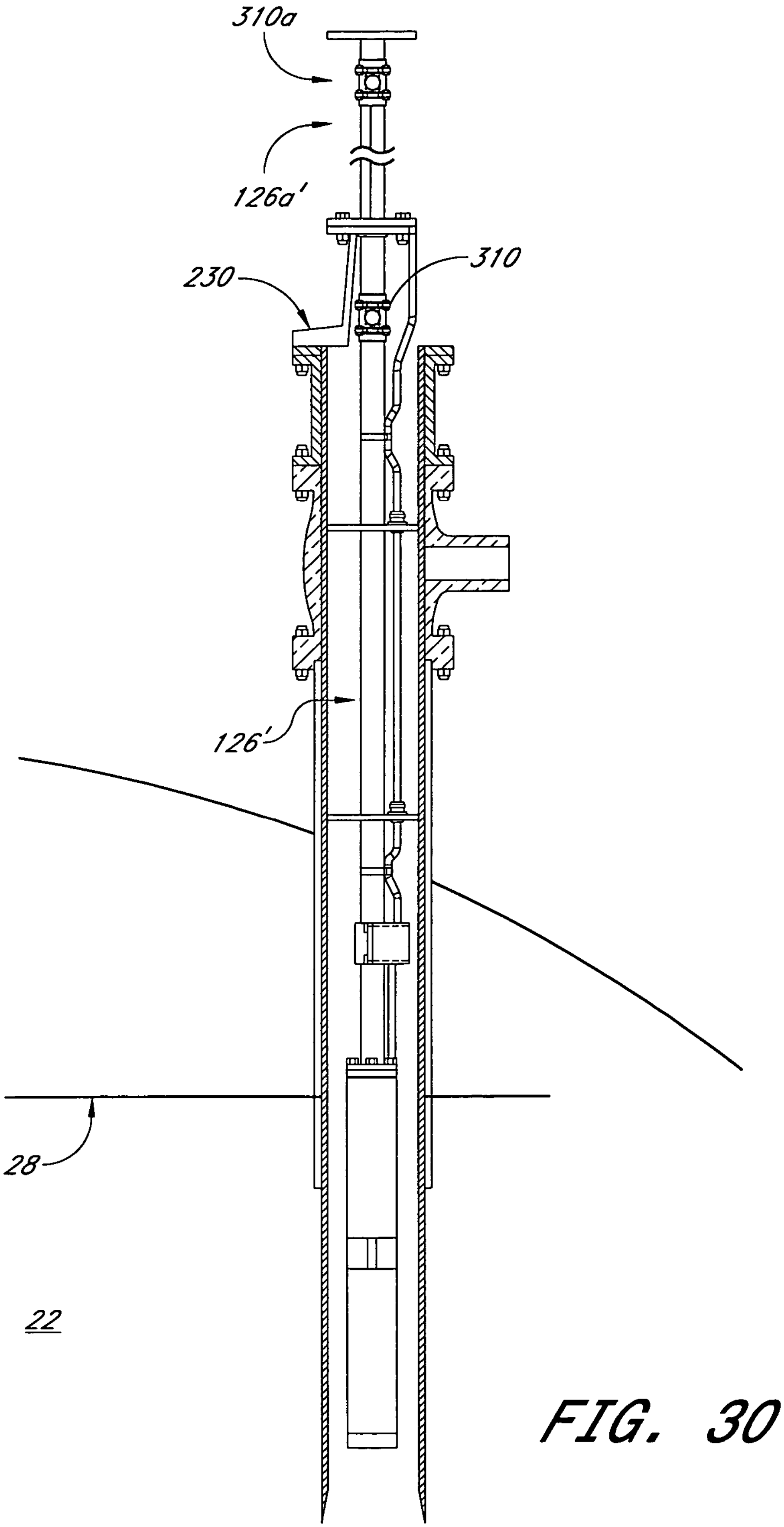
FIG. 30 is a side elevational and partial sectional view of the assembly of FIG. 29 with the discharge pipe thereof having been drawn out of the adapter assembly along with a collar for aiding in the assembly of the discharge pipe to a further discharge pipe.
Figure 31:
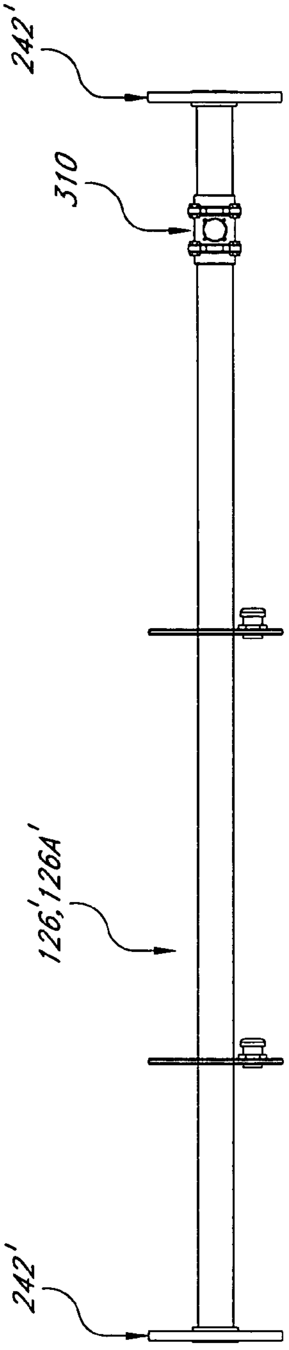
FIG. 31 is another embodiment of an additional discharge pipe that can be connected to the discharge pipe illustrated in FIG. 30.
Figure 32:
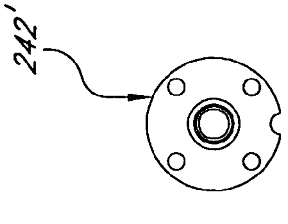
FIG. 32 is a top plan view of the discharge pipe section illustrated in FIG. 31.
Figure 33:
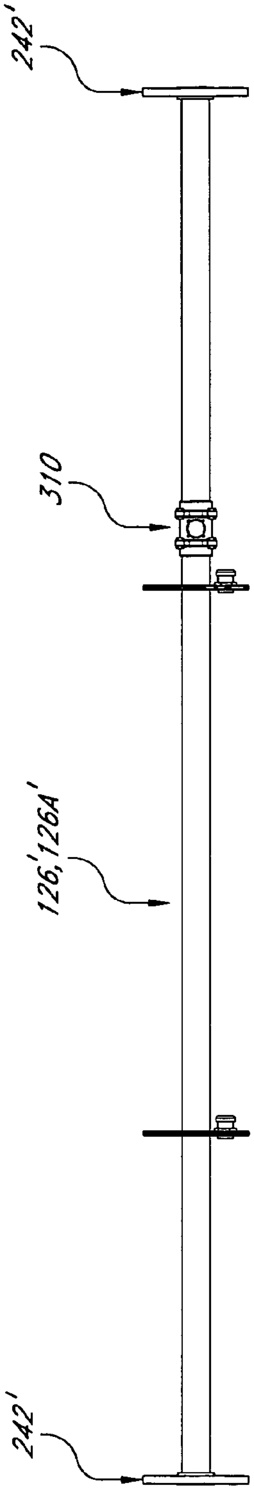
FIG. 33 is a side elevational view of another discharge pipe section having a length different from the discharge pipe section illustrated in FIG. 31.
Figure 34:
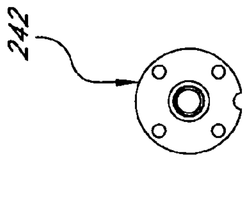
FIG. 34 is a top plan view of the discharge pipe section illustrated in FIG. 33.

With reference to FIG. 30, after the retainer 128 has been removed and the retainer 230 has been installed, the discharge pipe 126A' can be connected to the upper end of the discharge pipe 126'. At this point, the valve 310A of the discharge pipe 126A' is closed. Thus, the valve 310 on the discharge pipe 126' can be opened. As such, the valve 310A maintains the seal within the discharge pipe to prevent the discharge of any fluids from the tank 10. As such, the valves 310, 310A provide further protection against leaks of fluid from the vessel 22. For example, it is known that a balloon such as the balloon 138 can be operated improperly and thus, due to human error, can be allowed to slip out. However, if one of the valves 310, 310A are accidentally left open, they can simply be closed.

With reference to FIGS. 31-34, further detail of the discharge pipes 126', 126A' are illustrated therein. However, no further description of FIGS. 31-34 are necessary for one of ordinary skill in the art to make and use the inventions disclosed herein.

Figure 35:
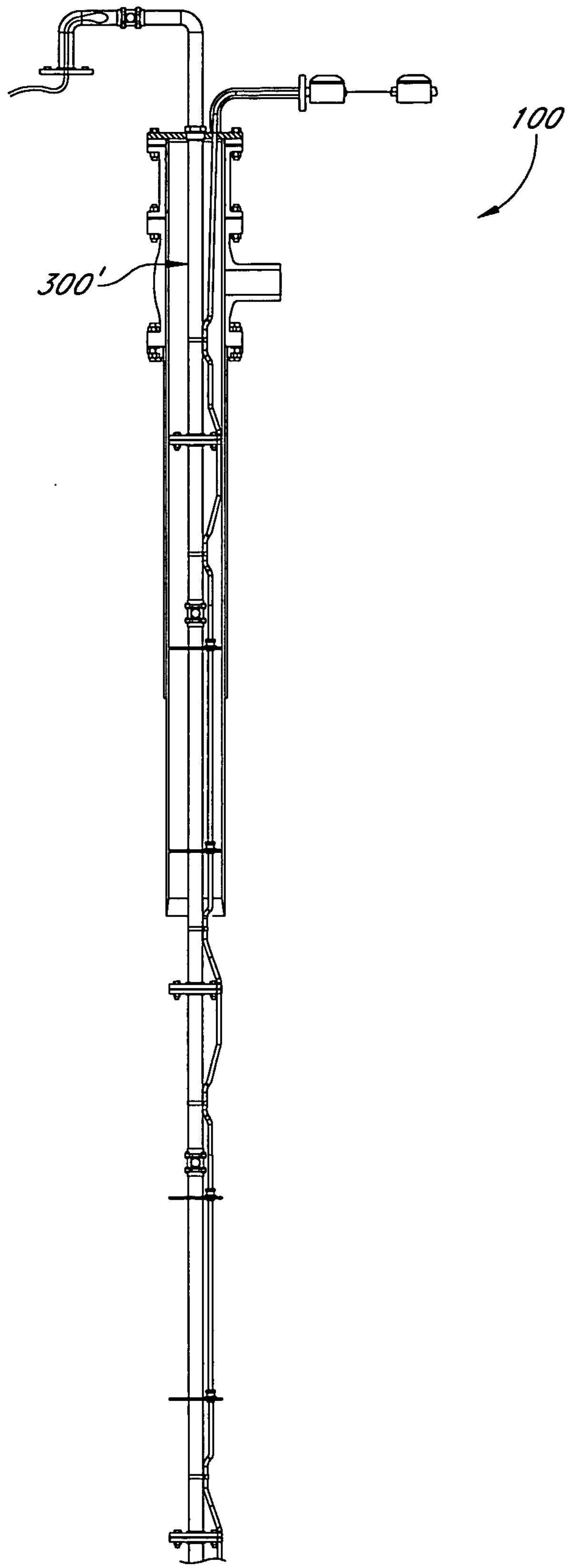
FIG. 35 is a side elevational and partial sectional view of the upper end of the second retrofit pump assembly being fully installed on the tank 10.

FIG. 35 illustrates a final discharge pipe 300' installed in the assembly 100. The final discharge pipe 300' can be constructed in accordance with the description of the final discharge pipe 300 illustrated in FIGS. 26-28. Thus, no further description of the discharge pipe 300' is necessary for one of ordinary skill in the art to make and use the inventions disclosed herein.

Figure 35A:
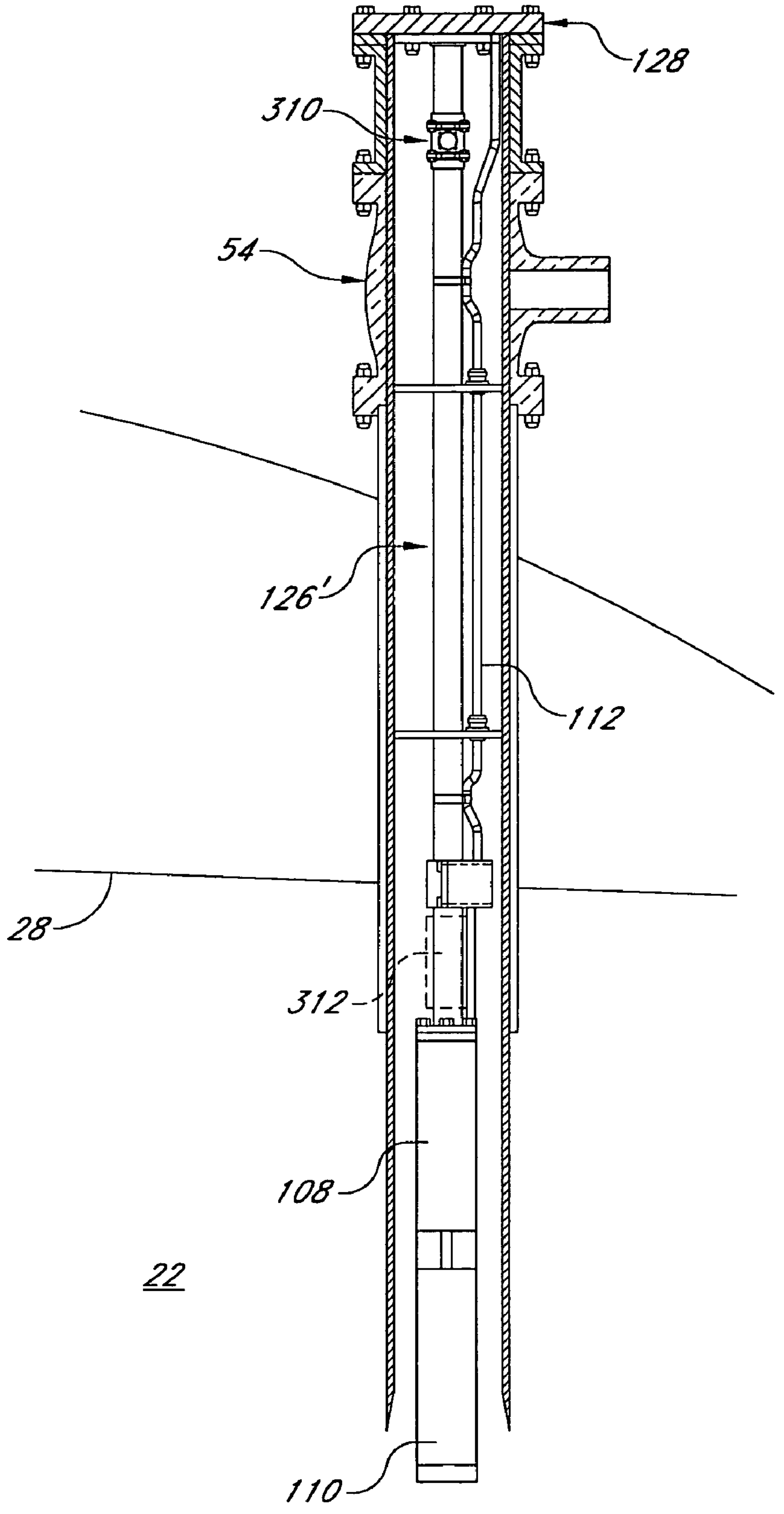
FIG. 35A is a side elevational and partial sectional view of a modification of the retrofit pump assembly of FIG. 29 including an expansion joint unit for use with the retrofit pump assembly.

With reference to FIG. 35A, a further advantage can be achieved by including an "expansion joint" in the assembly 100, in accordance with at least some of the inventions disclosed herein. In the illustrated embodiment, the expansion joint can be disposed in the discharge pipe 126 above the electric motor 108. A schematic illustration of an expansion joint in FIG. 35A is identified generally by the reference numeral 312.

Such expansion joints are commercially available for non-cryogenic uses. However, because this joint will be placed inside the tank 10 during use, the joint 312 can leak during use. Of course, it is preferable that such an expansion joint be optimized so as not to leak during use. Preferably, the expansion joint 312 will allow the discharge pipe 126' to expand enough so that the pump 110 remains on the lower surface 26 of the vessel 22. The dome 18 can rise about one foot due to the thermal expansion of the outer walls 14 caused by the change of night to day when sunlight strikes, and thereby expands, the walls 14. As such, the adapter 122 rises by the same amount, thereby causing the pump 110 to move away from the bottom 26 of the vessel 22.

Thus, in the illustrated embodiment, the expansion joint 312 can allow the pipe 126' to expand about one foot, thereby allowing the pump 110 to remain as close to the bottom 26 as possible.

Figure 36:
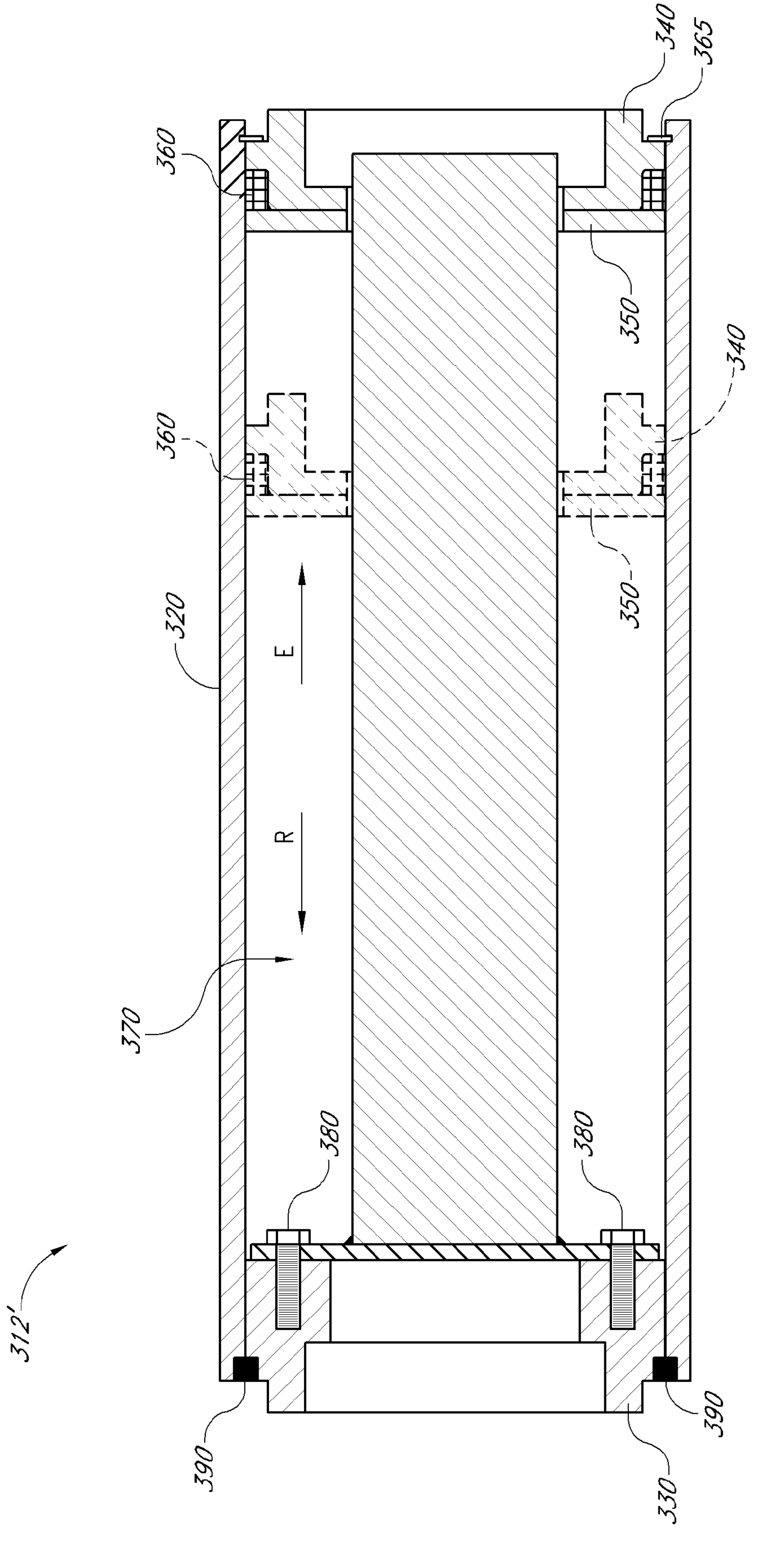
FIG. 36 is a cross-sectional view of a modification of the expansion joint unit shown in FIG. 35A.

FIG. 36 illustrates another embodiment of an expansion joint unit 312, identified generally by the reference numeral 312'. The expansion joint unit 312' preferably comprises a pipe member 320 sized to receive a fixed connector 330 and a movable connector 340 therein. In this embodiment, the movable connector 340 is sized to slidingly move within the pipe member 320. In FIG. 36, the arrow E identifies the extension direction and the arrow R identifies the retracting direction of the expansion joint unit 312'.

The movable connector 340 is preferably fastened to a support member 350 and houses a seal 360 therebetween, as is further described below. Additionally, a retaining member 365 is preferably disposed on the pipe member 320 to substantially limit the motion of the movable member 340. FIG. 36 illustrates the fully extended position of the expansion joint 312'. In the fully extended position, the moveable connector 340 abuts against the retainer member 365. In the fully retracted position, the moveable connector 340 abuts against the fixed connector 330. An intermediate position of the moveable connector 340 (in phantom line) is also illustrated in FIG. 36.

In some embodiments, the retaining member 365 can comprise a snap ring. However, in other embodiments, the retaining member 365 can be any structure configured to substantially limit the motion of the movable member 340, such as a detent or protrusion on the pipe member 320.

A further advantage is provided where the expansion joint unit 312' comprises an anti-rotation device 370 configured to prevent rotation of the lower end of the assembly relative to the upper portion of the assembly 100. For example, the pump 110 can include a shaft rotating about a vertical axis. Thus, the pump 110 can generate a torque, tending to cause the lower end of the discharge pips 126' to rotate relative to the upper end of the discharge pipe 126'. If this rotation occurs, the conduit 112 would be the only structure that could resist such a rotating motion, thereby imparting an undesirable stress on the conduit 112. Thus, by including an anti-rotation device in the expansion joint 312', such undesirable stresses can be avoided.

In some embodiments, the anti rotation device 370 can be fastened to the fixed connector 330 via fasteners 380. In the illustrated embodiment, the fasteners 380 consist of bolts. However, in other embodiments, the anti-rotation device 370 can be fastened to the fixed connector 330 using other fastening mechanisms, such as screws, adhesives, or welds. In still another embodiment, the fixed connector 330 and anti-rotation device 370 and be an integral unit.

In the illustrated embodiment, a fixation member 390 is disposed between at least a portion of the fixed connector 330 and the pipe member 320, as discussed further below. The fixation member 390 preferably maintains the fixed connector 330 in a substantially fixed position relative to the pipe member 320. In the illustrated embodiment, the fixation member 390 consists of at least one set screw. In other embodiments, the fixation member 390 can be a weld disposed between the fixed connector 330 and the pipe member 320. In another embodiment, the fixation member 390 can be an adhesive disposed between the fixed connector 330 and the pipe member 320. In still another embodiment, the fixed connector 330 can be connected to the pipe member 320 via a press-fit connection.

Figure 37D:
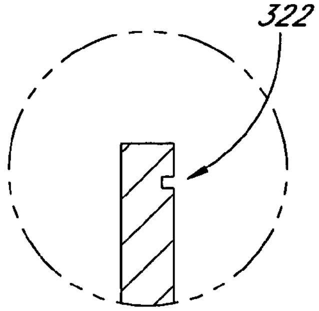
FIG. 37D is an enlarged view of a cross-sectional portion of the pipe member shown in 37C identified by the circle D.
Figure 37E:
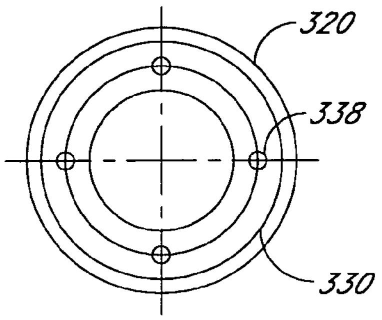
FIG. 37E is a top view of the assembly of the pipe member and connector shown in FIG. 37C.
Figure 37A:
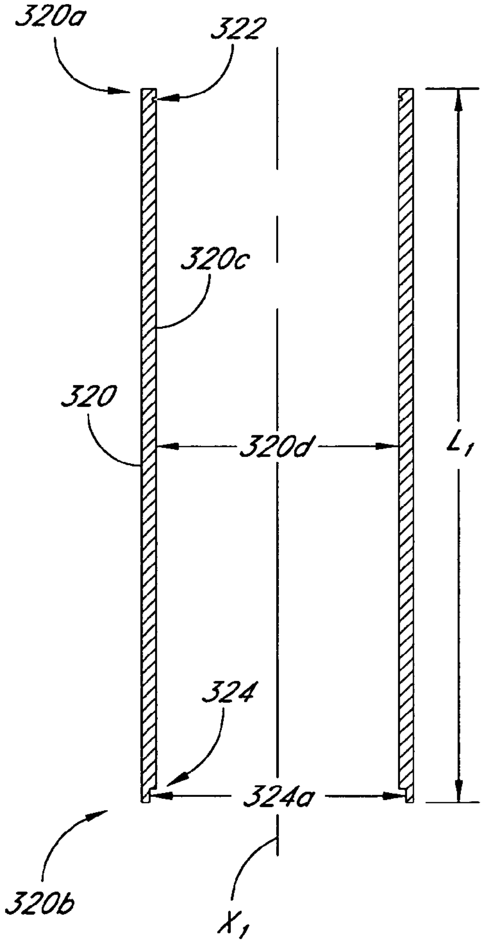
FIG. 37A is a cross-sectional view of a pipe member of the expansion joint unit.

With reference to FIGS. 37A-E, the pipe member 320 and fixed connector 330 of the expansion joint unit 312 are illustrated in greater detail. As shown in FIG. 37A, the pipe member 320 has a length L1 that extends between a proximal end 320*a* and a distal end 320*b* of the pipe member 320.

The proximal end 320*a* preferably connects to the movable connector 340, as shown in FIG. 36. Similarly, the distal end 320*b* preferably connects to the fixed connector 330.

With reference to FIGS. 37A-D, the pipe member 320 defines an inner surface 320*c* that preferably extends circumferentially about an axis X1 of the pipe member 320 at a diameter 320*d*. In the illustrated embodiment, the inner surface 320*c* is preferably a cylindrical surface, with a circular cross-section. However, in other embodiments the inner surface 320*c* can have other cross-sectional shapes, such as square or polygonal, with a corresponding effective diameter 320*d*.

Figure 37C:
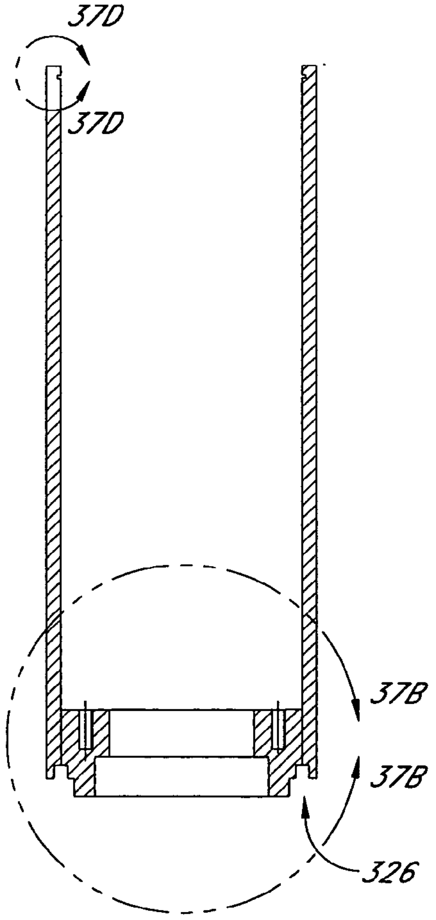
FIG. 37C is a cross-sectional view of an assembly of the pipe member shown in FIG. 37A and the connector shown in FIG. 37B.

As shown in FIGS. 37C and 37D, the pipe member 320 preferably comprises a slot 322 on the inner surface 320*c* and disposed substantially at the proximal end 320*a* of the pipe member 320. The slot 322 preferably receives the retaining member 365 therein. In one embodiment, the slot 322 lockingly engages the retaining member 365. Preferably, the slot 322 extends substantially continuously along the inner surface 320*c* of the pipe member 320. In another embodiment, the slot 322 can consist of a number of discreet slots 322 disposed along the inner surface 320*c* of the pipe member 320.

As shown in FIG. 37A, the inner surface 320*c* of the pipe member 320 also defines a recess 324 having a diameter 324*a* at the distal end 320*b* of the pipe member 320. Preferably, the diameter 324*a* of the recess 324 is greater than the diameter 320*d* of the inner surface 320*c*. In the illustrated embodiment, the recess 324 extends substantially continuously about the circumference of the inner surface 320*c*. In another embodiment, the recess 324 consists of discreet recesses 324 disposed about the circumference of the inner surface 320*c*.

Figure 37B:
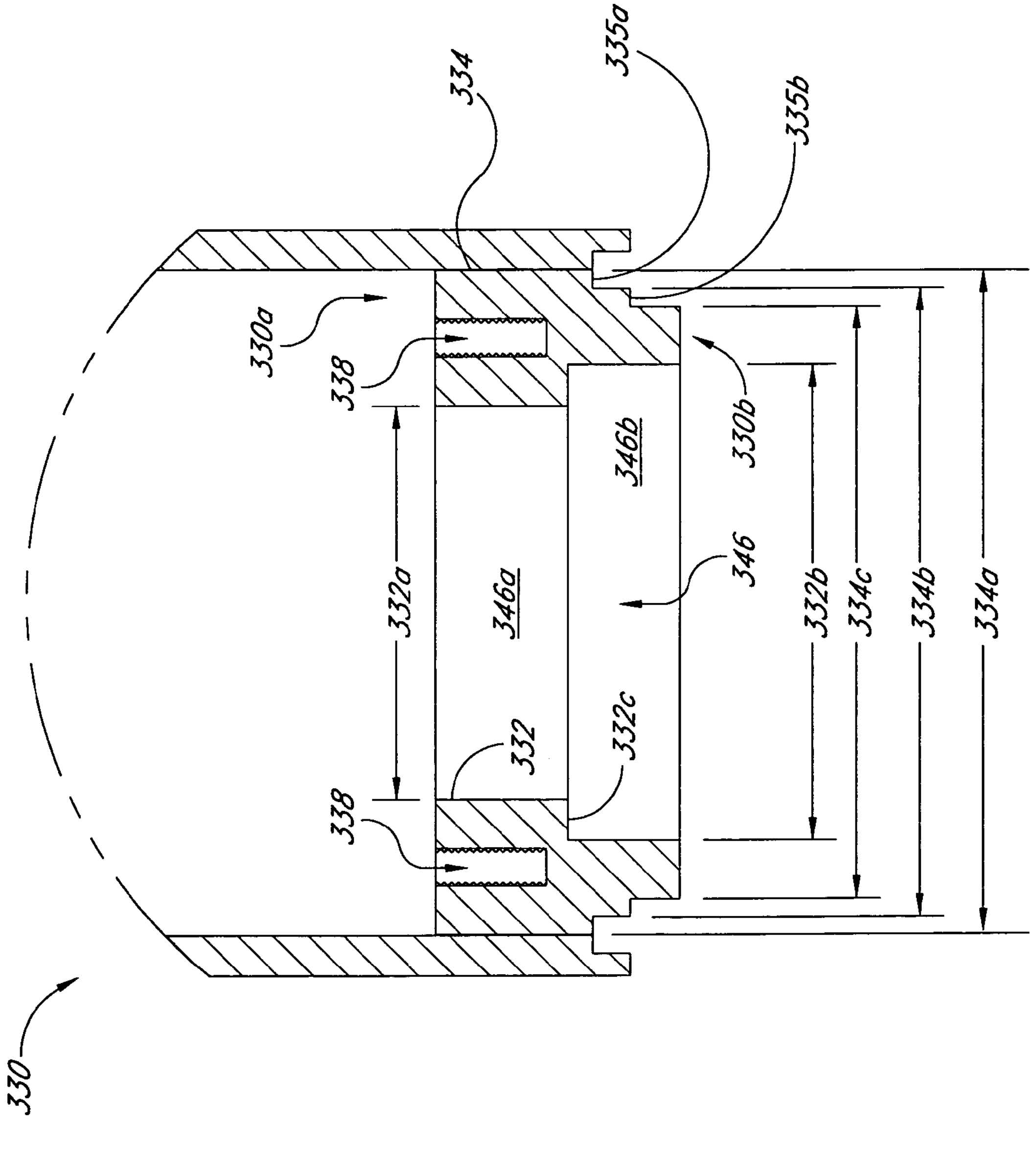
FIG. 37B is a cross-sectional view of a connector of the expansion joint unit.

With reference to FIG. 37B, the fixed connector 330 extends from a proximal end 330*a* to a distal end 330*b*, and has inner and outer surfaces 332. 334. In the illustrated embodiment, at least a portion of the inner surface 332 has a first diameter 332*a,* and at least second portion of the inner surface 332 has a second diameter 332*b*. Preferably, the second diameter 332*b* is greater than the first diameter 332*a,* so as to define a retaining surface 332*c* on the inner surface 332.

Likewise, at least a portion of the outer surface 334 has a first diameter 334*a*, at least a second portion of the outer surface 334 has a second diameter 334*b*, and at least a third portion of the outer surface 334 has a third diameter 334*c*. Preferably, the first diameter 334*a* is greater than the second diameter 334*b*, so as to define a first retaining surface 335*a*, and the second diameter 334*b* is greater than the third diameter 334*c*, so as to define a second retaining surface 335*b*. In another embodiment, the diameters 334*a*, 334*b*, 334*c* can have substantially the same dimension. In still another embodiment, at least two of the diameters 334*a*, 334*b*, 334*c* can have the same dimension.

In the illustrated embodiment, the inner surface 332 defines a passage 336 through the fixed connector 330. Preferably, the passage 336 consists of a proximal section 336*a* and a distal section 336*b*. In one embodiment, the first diameter 332*a* of the inner surface 332 defines the proximal section 336*a*. Likewise, the second diameter 332*b* of the inner surface 332 defines the distal section 336*b*. Additionally, at least one fastener opening 338 is formed on the proximal end 330*a* of the fixed connector 330. The fastener openings 338 preferably receive the fasteners 380 therein, as discussed above and shown in FIG. 36. For example, in one embodiment the fastener openings 338 can have a threaded surface that engages a corresponding thread on the fasteners 380.

As illustrated in FIG. 37C, the first diameter 334*a* of the outer surface 334 is preferably about the same dimension as the inner diameter 320_d_ of the pipe member 320. In one embodiment, the first diameter 334_a_ can be slightly larger than the inner diameter 320_d_ of the pipe member 320 so that the fixed connector 330 and pipe member 320 are joined via a press-fit connection. In another embodiment, the first diameter 334_a_ is smaller than the inner diameter 320_d_ of the pipe member 320. With the fixed connector 330 disposed in the pipe member 320, at least one of the portions of the outer surface 334 having second and third diameters 334_b_, 334_c_ defines a slot 326 between the pipe member 320 and the fixed connector 330, as shown in FIG. 37C. The slot 326 preferably receives the fixation member 390, as discussed above. In a preferred embodiment, the slot 326 extends substantially continuously about the circumference of the fixed connector 330. In another embodiment, the slot 326 consists of a number of discreet slots 326 disposed circumferentially about the outer surface 334 and between the fixed connector 330 and the pipe member 320.

In the illustrated embodiment, as shown in FIGS. 37B and C, the distal section 336_b_ of the passage 336 preferably receives at least a portion of the pump assembly 106 therein. In one embodiment, said portion of the pump assembly 106 extends into the distal section 336_b_ so as to contact the retaining surface 332_c_. In another embodiment, the portion of the inner surface 332 having second diameter 332_b_ can be threaded to engage a corresponding threaded surface on the pump assembly 106. In still another embodiment, said portion of the pump assembly 106 can be press-fit to the distal section 336_b_ of the passage 336. In yet another embodiment, the pump assembly 106 can be welded to the distal section 336_b_ of the passage 336.

As shown in FIGS. 37E, the inner and outer surfaces 332, 334 of the fixed connector 330 are preferably circular. However, in other embodiments the inner and outer surfaces 332, 334 can have other shapes, such as square and polygonal. Preferably, the outer surface 334 has the same shape as the inner surface 320_d_ of the pipe member 320. Similarly, the inner surface 332 that defines the distal section 336_b_ of the passage 336 preferably has the same shape as the portion of the pump assembly 106 that is inserted therein.

Figure 38D:
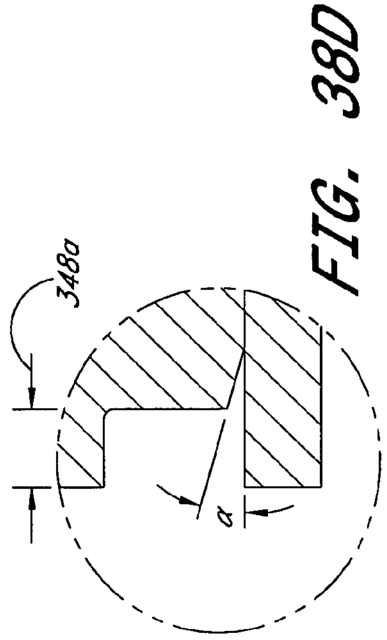
FIG. 38D is an enlarged view of the portion of the connector of FIG. 38C identified by the circle D.
Figure 38A:
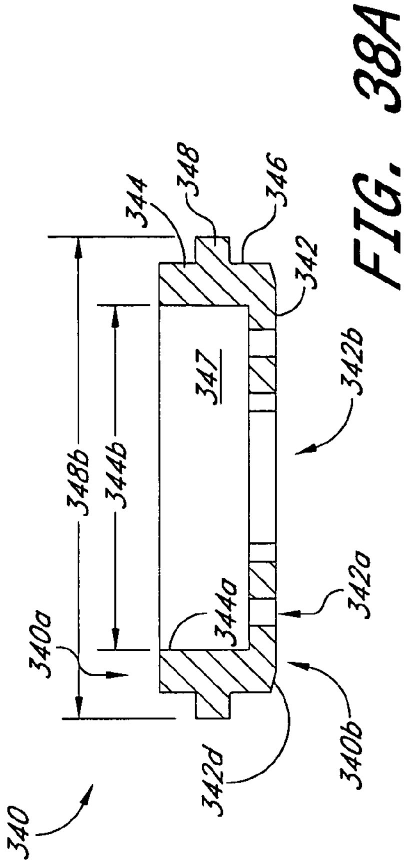
FIG. 38A is a cross-sectional view of a connector of the expansion joint unit.
Figure 38B:
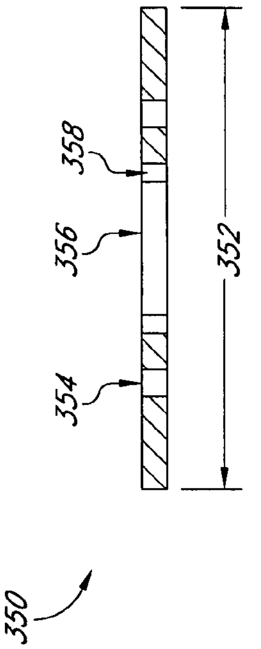
FIG. 38B is a cross-sectional view of a support member of the expansion joint unit.
Figure 38E:
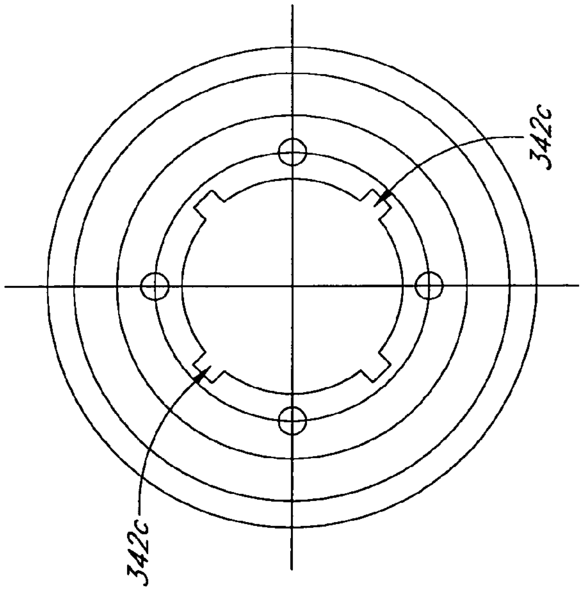
FIG. 38E is a top view of an assembly of the connector shown in FIG. 38A and the support member shown in FIG. 38B
Figure 38C:
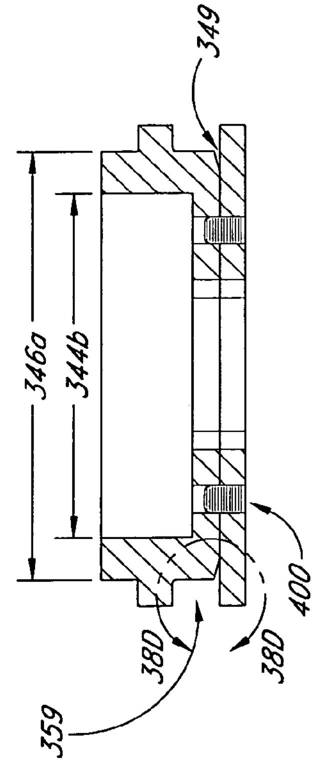
FIG. 38C is a cross-sectional view of an assembly of the connector illustrated in FIG. 38A and the support member illustrated in FIG. 38B.

FIGS. 38A-E further illustrate the movable connector 340 of the expansion joint unit 312. As illustrated in FIG. 38A, the movable connector 340 extends between a proximal end 340_a_ and a distal end 340_b_ and preferably comprises a base 342 at the distal end 340_b_. In the illustrated embodiment, the base 342 defines at least one fastener opening 342_a_ and a primary opening 342_b_, wherein the openings 342_a_, 32_b_ extend through the base. Each fastener opening 342_a_ preferably receives a fastener 400 therethrough (see FIG. 38C). As shown in FIG. 38C, the fastener 400 can be a threaded anchor. However, in other embodiments, the fasteners 400 can be dowels, bolts, screws, adhesives, welds, brackets, braces or any other fastening mechanisms suitable for use in a cryogenic environment.

Likewise, the primary opening 342_b_ preferably slidingly receives the anti-rotation device 370 therethrough. As shown in FIG. 38E, the base 342 preferably has at least one slot 342_c_ formed therein that extends outward from the primary opening 342_b_. Said slots 342_c_ preferably receive the anti-rotation device 370 therethrough, as further discussed below.

As best illustrated in FIG. 38D, the base 342 also preferably has a chamfer 342_d_ at the distal end 340_b_ of the movable connector 340 that is oriented at an angle $\alpha$ relative to the base 342. The chamfer 342_d_ can be at any angle.

With reference to FIG. 38A, the movable connector 340 also preferably comprises a circumferential wall 344 that extends from the base 342 to a free end at the proximal end 340_a_ of the movable connector 340. The wall 344 has an inner surface 344_a_ with an inner diameter 344_b_, and an outer surface 346 with an outer diameter 346_a_. The inner surface 344_a_ and the base 342 define a cavity 347 therebetween.

In the illustrated embodiment, at least one protrusion 348 having a width 348_a_ extends outward from the outer surface 346 of the wall 344 to an outer diameter 348_b_. In one preferred embodiment, the protrusion 348 extends substantially continuously about the circumference of the outer surface 346 and the width 348_a_ extends radially outward from the outer surface 346 of the wall 344. In another embodiment, the protrusion 348 consists of a number of discrete protrusions 348 that extends radially outward from the outer surface 346 of the wall 344. Preferably, the outer diameter 348_b_ of the protrusion 348 is smaller than the inner diameter 320_d_ of the pipe member 320, so that the movable connector 340 can slidably move within the pipe member 320.

In some embodiments, the cavity 347 receives one end of the discharge pipe 126' therein. The inner diameter 344_b_ of the wall 344 is generally about the same dimension as the outer diameter of the discharge pipe 126'. In another embodiment, the inner diameter 344_b_ of the wall 344 can be slightly smaller than the outer diameter of the discharge pipe 126' to join the movable connector 340 and the discharge pipe 126' via a press-fit connection. In still another embodiment, the inner surface 344_a_ can be threaded to engage a corresponding thread on the outer surface of the discharge pipe 126'. In yet another embodiment, the inner surface 344_a_ of the movable connector 340 can be welded to the outer surface of the discharge pipe 126'. In still other embodiments, the movable connector 340 can be fastened to the discharge pipe 126' via other fastening mechanisms, such as bolts, screws, adhesives, brackets and braces.

FIG. 38B illustrates a support member 350 that is preferably fastened to the base 342 of the movable connector 340. In another embodiment, the support member 350 and movable connector 340 can be manufactured as an integral unit. The support member 350 has a diameter 352 that is preferably smaller than the inner diameter 320_d_ of the pipe member 320, so that the support member 350 slidably moves within the pipe member 320. In the illustrated embodiment, the support member 350 has a diameter 352 of approximately the same dimension as the outer diameter 348_b_ of the protrusion 348. However, in other embodiments, the support member 350 can have a diameter 352 smaller or larger than the diameter 348_b_ of the protrusion 348.

The support member 350 comprises a number of fastener openings 354 therethrough, wherein each opening 354 can be aligned with the corresponding fastener opening 342_a_ in the base 342 of the movable connector 340. The support member 350 also comprises a primary opening 356 that preferably aligns with primary opening 342_b_ in the base 342 of the movable connector 340 when the movable connector 340 and the support member 350 are adjacent each other. The support member 350 also preferably comprises at least one slot 358 formed therein and extending outward from the primary opening 356, wherein said primary opening 356 and slots 358 slidingly receive the anti-rotation device 370 therethrough.

FIG. 38C illustrates an assembly of the movable connector 340 and support member 350. In the illustrated embodiment, the fasteners 400 extend through the fastener openings 342_a_, 354 to connect the movable connector 340 and support member 350 together. Though the illustrated embodiment shows the fasteners 400 as threaded inserts, the fasteners 396 can comprise other fastening mechanisms, as discussed above.

With further reference to FIG. 38C, the protrusion 348 defines a space 359 between the support member 350 and movable connector 340. In a preferred embodiment, the sealing member 360 is disposed in the space 359, as shown in FIG. 36. In one embodiment, the seal 360 comprises Teflon rope. However, in other embodiments, the seal 360 can be made of other materials suitable for used in cryogenic environments. Preferably, the seal 360 substantially prevents the leakage of fluid through the space 359 between the support member 350 and the protrusion 348 of the movable connector 340.

FIG. 38D shows an enlarged view of a section of the base 342 of the movable connector 340. Preferably, the chamfer 342*d* defines a slot 349 between the base 342 and the support member 350 when the support member 350 is adjacent the movable connector 340. In a preferred embodiment, the slot 349 receives a seal disposed between the movable connector 340 and the support member 350. In another embodiment, the slot 349 can receive a weld therein to fasten the support member 350 to the movable connector 340 and substantially prevent leakage of fluid through the slot 349.

FIG. 38E shows a top view of the support member 350 and movable connector 340 assembly. In the illustrated embodiment, the slots 342*c* disposed along the periphery of the primary opening 342*b* of the movable connector 340 and the slots 358 disposed around the periphery of the primary opening 356 of the support member 350, are substantially aligned with each other. The slots 342*c*, 358 preferably receive at least a portion of the anti-rotation device 370 therethrough. Although the illustrated embodiment shows four slots 342*c*, 358 in the primary openings 342*b*, 356 of the movable connector 340 and support member 350, respectively, the number of slots 342*c*, 358 can be fewer or greater.

FIG. 37E also illustrates the position of the fastener openings 342*a*, 354 in the movable connector 340 and support member 350. Although four fastener openings 342*a*, 354 are shown, the movable connector 340 and support member 350 can have fewer or more fastener openings 342*a*, 354.

FIGS. 39A-F further illustrate one embodiment of an anti-rotation device. In the illustrated embodiment, the anti-rotation device 370 comprises an elongated beam member 372 that extend between a proximal end 372*a* and a distal end 372*b* and defines a length L2 therebetween. Preferably, the beam member 372 extends about an axis X2.

Figure 39B:
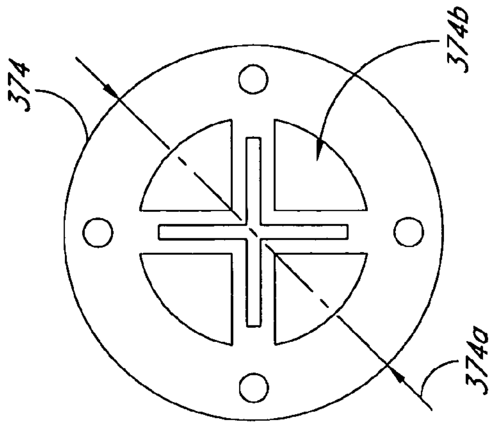
FIG. 39B is a top view of the anti-rotation device illustrated in FIG. 39A.
Figure 39A:
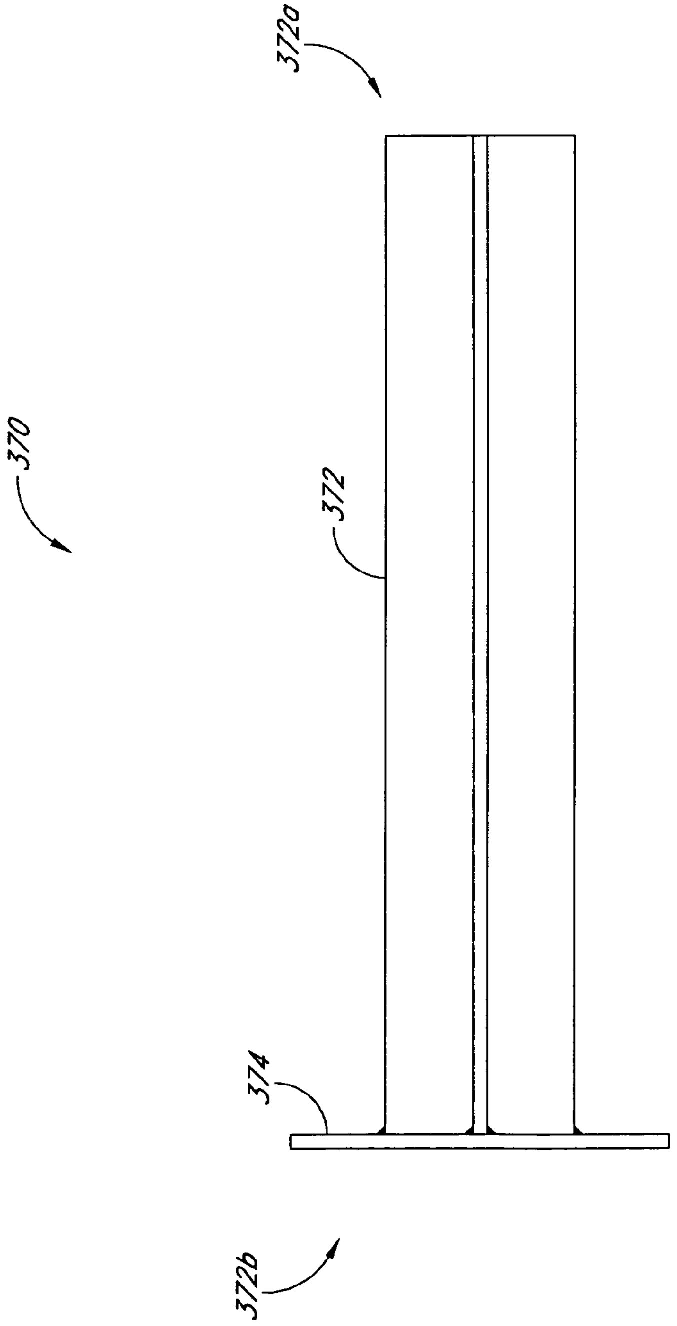
FIG. 39A is an elevational view of an anti-rotation device of the expansion joint unit.
Figure 39D:
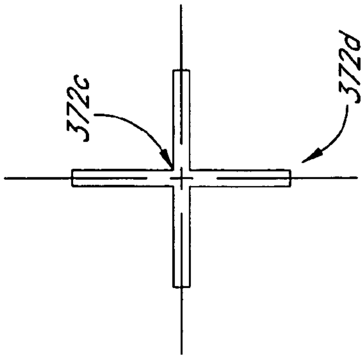
FIG. 39D is a top view of the beam member shown in FIG. 39C.
Figure 39C:
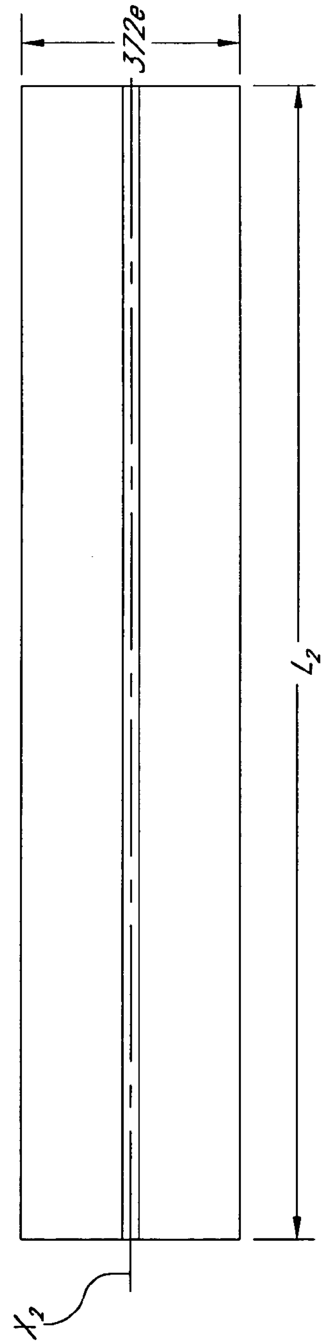
FIG. 39C is a side elevational view of a beam member of the anti-rotation device illustrated in FIG. 39A.
Figure 39E:
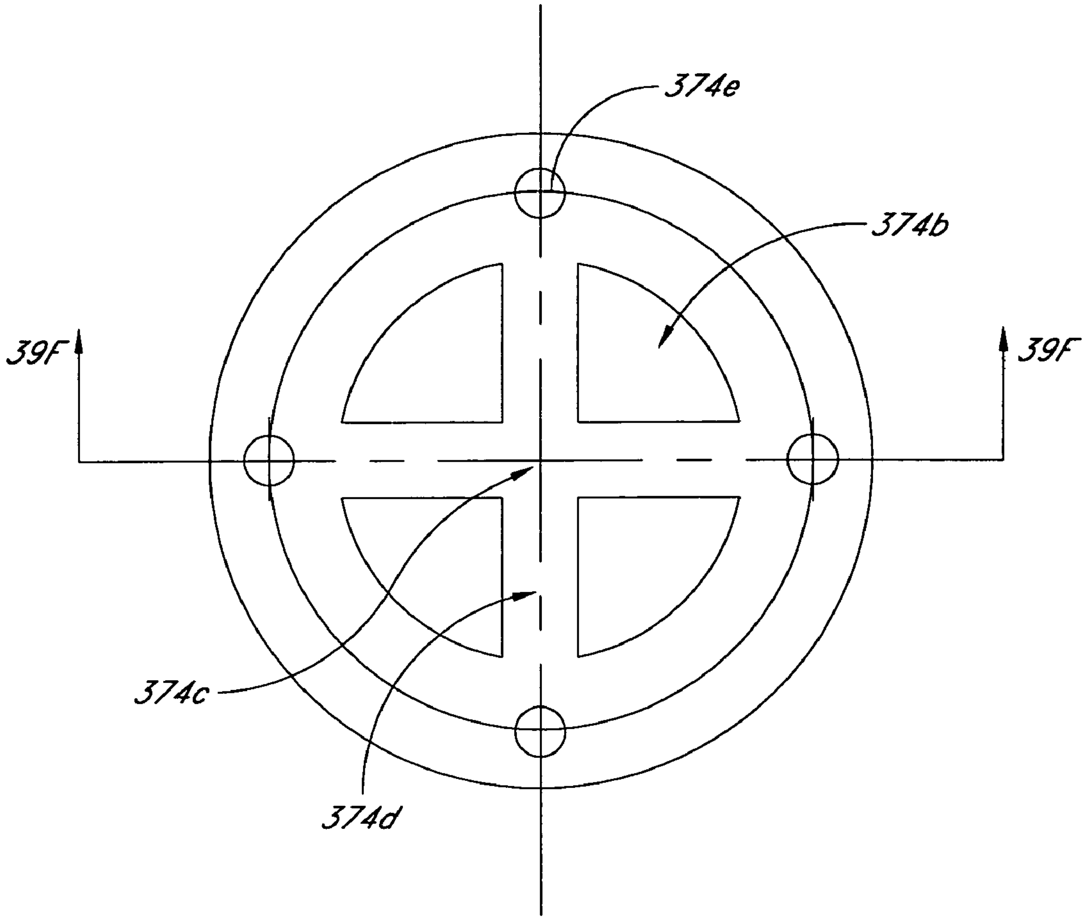
FIG. 39E is a top view of a flange member of the anti-rotation device shown in FIG. 39A.
Figure 39F:
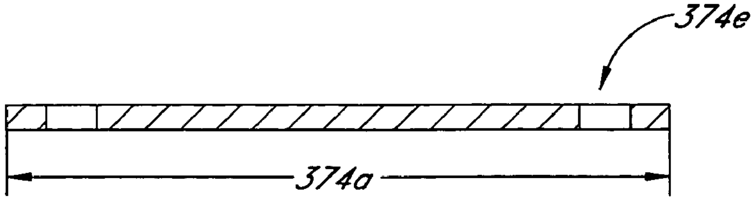
FIG. 39F is a cross-sectional side view of the flange member shown in FIG. 39E.

As shown in FIG. 39D, in the illustrated embodiment the beam member 372 has a cross-section generally in the shape of a cross extending from a center 372*c* to ends 372*d*. Preferably, the ends 372*d* are sized to slidably move within the slots 342*c*, 358 of the movable connector 340 and support member 350. Additionally, the ends 372*d* are preferably sized to have an effective diameter 372*e* that is lower than the inner diameter of the discharge pipe 126'. However, the beam member 372 can have other cross-sectional shapes, such as square, triangular, or polygonal.

With reference to FIGS. 39B, and E-F, the anti-rotation device 370 also preferably comprises a base 374 with a diameter 374*a* that connects to the distal end 372*b* of the beam member 372. In the illustrated embodiment, the base 374 connects to the beam member 372 via a weld. In other embodiments, the base 374 can be connected to the beam member 372 with other fastening mechanisms, such as adhesives, bolts, screws, brackets or braces. In still another embodiment, the base 374 and beam member 372 can be an integral unit.

The diameter 374*a* of the base 374 preferably has approximately the same size as the first diameter 334*a* of the outer surface 334 of the fixed connector 330. In another embodiment, the diameter 374*a* of the base 374 can be lower than the first diameter 334*a* of the fixed connector 330. In another embodiment, the diameter 374*a* of the base 374 can be greater than the first diameter 334*a* of the fixed connector 330. Additionally, the diameter 374*a* of the base 334 is preferably approximately the same size as the inner diameter 320*d* of the pipe member 320.

The base 374 preferably defines a number of primary openings 374*b* disposed about a center 374*c* of the base 374 on either side of arms 374*d* of the base 374. In a preferred embodiment, the arms 374*d* of the base 374 support the ends 372*d* of the beam member 372 and the center 372*c* of the beam member 372 generally aligns with the center 374*c* of the base 374. Though the illustrated embodiment shows four primary openings 374*b* having a generally triangular shape, the base 374 can have more or fewer primary openings 374*b* having other shapes suitable for allowing fluid flow therethrough.

The base 374 also preferably defines fastener openings 374*e* disposed circumferentially along the base 374 and sized to receive the fasteners 380 as discussed above. The fastener openings 374*e* preferably align with corresponding fastener openings 338 on the fixed connector 330 of the expansion joint unit 312, as illustrated in FIGS. 36, and 37B, E. Though the illustrated embodiment shows four fastener openings 374*c*, the base 374 can have more or fewer fastener openings 374*e*.

The expansion joint unit 312 is preferably made of materials suitable for use in cryogenic environments. For example, in one embodiment, the expansion joint unit 312 can be made of stainless steel. In another embodiment, the expansion joint unit 312 can be made of aluminum. In other embodiments, the expansion joint unit 312 can be made of high strength materials appropriate for a cryogenic environment.

During use, the expansion joint unit 312 can better maintain the pump 110 in contact or in close proximity with the lower surface 26 of the vessel 22. For example, during operation, the expansion joint unit 312 is preferably fastened to the discharge member 126' and to the pump assembly 106, as described above. The discharge member 126', expansion joint unit 312, and pump assembly 106 are then lowered into the vessel 22 until the pump 110 substantially contacts the lower surface 26 of the vessel 22.

Preferably, the discharge member 126' is further lowered so that the movable connector 340, to which the discharge member 126' is attached, movably slides within the pipe member 320 of the expansion joint unit 312, and so the beam member 372 of the anti-rotation device 370 extends into the discharge member 126'.

In a preferred embodiment, the discharge member 126' is lowered about one foot into the pipe member 320 of the expansion joint unit 312. In another embodiment, the discharge member 126' can be lowered less than one foot into the pipe member 320 of the expansion joint unit 312. In still another embodiment, the discharge member 126' can be lowered less than one foot into the pipe member 320 of the expansion joint unit 312. In yet another embodiment, the discharge member 126' can be lowered into the pipe member 320 of the expansion joint unit 312 by at least an amount corresponding to the expected rise of the dome 18 of the vessel 22 due to thermal expansion. Accordingly, as the dome 18 of the vessel 22 rises due to thermal expansion, as discussed above, said expansion also causes the discharge pipe 126' to withdraw from the expansion joint unit 312. However, in a preferred embodiment said withdrawal of the discharge pipe 126' does not displace the pump 110 from the lower surface 26 of the vessel 22.

The expansion joint unit 312 preferably also substantially prevents the rotation of the pump assembly 106 relative to the discharge pipe 126'. As discussed above, the ends **372*d* of the beam member 372 preferably slidably move within the slots 342*c*, 358 of the movable connector 340 and support member 350. Accordingly, the ends 372*d* and slots 342*c*, 358 operate as a key and keyway system, preventing the rotation of the beam member 372 within the pipe member 320. Accordingly, any rotational force generated by the electric motor 108 does not cause the rotation of the anti-rotation device 370 relative to the discharge pipe 126'**.

The expansion joint unit 312 preferably allows the pump 110 to remove RLNG from the vessel 22. The RLNG preferably flows through the passage 336 of the movable connector 330. The RLNG then flows through the primary openings **374*b* of the base 374 of the anti-rotation device 370. Subsequently, the RLNG passes through the pipe member 320 and the primary openings 342*b*, 356 of the movable connector 340 and support member 350. The RLNG then flows into the discharge pipe 126' for withdrawal from the vessel 22** as described above.

Although the inventions disclosed herein have been disclosed in the context of certain preferred embodiments and examples, it will be understood by those skilled in the art that the inventions disclosed herein extend beyond the specifically disclosed embodiments to other alternative embodiments and/or uses of the inventions and obvious modifications and equivalents thereof. Thus, it is intended that the scope of the inventions disclosed herein should not be limited by the particular disclosed embodiments described above, but should be determined only by a fair reading of the claims that follow.

What is claimed is:

1. An expansion joint unit defining a conduit for a cryogenic fluid, comprising:

a pipe member, a movable connector movably disposed at one end of said pipe member and defining an opening therethrough;

a fixed connector disposed at an opposite end of said pipe member in a substantially fixed position relative to the pipe member and defining an opening therethrough; and an anti-rotation device disposed in the pipe member and connected to the fixed connector, the anti-rotation device having an opening therethrough and configured to substantially prevent the rotation of the fixed connector relative to the movable connector while the moveable connector moves within the pipe member;

wherein the anti-rotation device comprises an elongated beam member extending along a longitudinal direction, the pipe member also extending along the longitudinal direction.

2. The expansion joint unit of claim 1, wherein a fixation member maintains the fixed connector in a substantially fixed position relative to the pipe member.

3. The expansion joint unit of claim 2, wherein the fixation member is a set screw.

4. The expansion joint unit of claim 1, further comprising a support member adjacent the movable connector, and a seal disposed between the support member and the movable connector.

5. The expansion joint unit of claim 4, wherein the seal is made of rope.

6. The expansion joint unit of claim 1, wherein the elongated beam comprises a cross-shaped cross section, and wherein the opening in the moveable member is shaped to engage at least a portion of the elongated beam having the cross-shaped section so as to prevent rotation while the moveable connector moves within the pipe member.

7. An expansion joint unit defining a conduit for a cryogenic fluid, comprising:

a pipe member, a movable connector movably disposed at one end of said pipe member and defining an opening therethrough;

a fixed connector disposed at an opposite end of said pipe member in a substantially fixed position relative to the pipe member and defining an opening therethrough; and an anti-rotation device disposed in the pipe member and connected to the fixed connector, the anti-rotation device having an opening therethrough and configured to substantially prevent the rotation of the fixed connector relative to the movable connector while the moveable connector moves within the pipe member;

wherein the moveable connector and the anti-rotation device are configured to allow the moveable connector to slide within the pipe member over a distance of about one foot without rotating relative to the fixed connector.

8. An expansion joint unit defining a conduit for a cryogenic fluid, comprising:

a pipe member, a movable connector movably disposed at one end of said pipe member and defining an opening therethrough;

a fixed connector disposed at an opposite end of said pipe member in a substantially fixed position relative to the pipe member and defining an opening therethrough;

an anti-rotation device disposed in the pipe member and connected to the fixed connector, the anti-rotation device having an opening therethrough and configured to substantially prevent the rotation of the fixed connector relative to the movable connector while the moveable connector moves within the pipe member; and a second pipe member sealed to the moveable connector and a pump connected to the fixed connector, wherein the anti-rotation device is configured to resist a rotational force generated by the pump.

* * * * *

UNITED STATES PATENT AND TRADEMARK OFFICE

CERTIFICATE OF CORRECTION

PATENT NO. : 7,591,487 B2
APPLICATION NO. : 10/983357
DATED : September 22, 2009
INVENTOR(S) : Smith, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1136 days.

Signed and Sealed this

Twenty-first Day of September, 2010

David J. Kappos

*Director of the United States Patent and Trademark Office*